(12) United States Patent
Brendle et al.

(10) Patent No.: US 8,180,845 B2
(45) Date of Patent: May 15, 2012

(54) REMOTE DEBUGGING OF SOFTWARE

(75) Inventors: Rainer Brendle, Neckargemuend (DE); Frank Brunswig, Heidelberg (DE); Duong-Han Tran, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1508 days.

(21) Appl. No.: 10/740,384

(22) Filed: Dec. 17, 2003

(65) Prior Publication Data

US 2005/0138113 A1 Jun. 23, 2005

(51) Int. Cl.
*G06F 15/16* (2006.01)
(52) U.S. Cl. .......................................... 709/217; 709/203
(58) Field of Classification Search ................... 709/203, 709/205, 217
See application file for complete search history.

(56) References Cited

U.S. PATENT DOCUMENTS

| | | | | |
|---|---|---|---|---|
| 5,471,526 A | * | 11/1995 | Linnermark et al. | 379/268 |
| 6,058,393 A | * | 5/2000 | Meier et al. | 707/10 |
| 6,202,200 B1 | * | 3/2001 | House et al. | 717/100 |
| 6,263,456 B1 | * | 7/2001 | Boxall et al. | 714/31 |
| 6,324,683 B1 | * | 11/2001 | Fuh et al. | 717/124 |
| 6,741,586 B1 | * | 5/2004 | Schuster et al. | 370/352 |
| 2004/0010778 A1 | * | 1/2004 | Kaler et al. | 717/130 |
| 2007/0053367 A1 | * | 3/2007 | Tyebji | 370/401 |
| 2008/0126798 A1 | * | 5/2008 | Ginter et al. | 713/164 |
| 2010/0034200 A1 | * | 2/2010 | MeLampy et al. | 370/352 |

* cited by examiner

*Primary Examiner* — Jeffrey Pwu
*Assistant Examiner* — Noel Beharry
(74) *Attorney, Agent, or Firm* — Finnegan, Henderson, Farabow, Garrett & Dunner, LLP

(57) ABSTRACT

Methods and apparatus, including computer program products, for allowing an end user at an end user system to remotely debug a back-end application program executing on a back-end system. To access the services of the back-end application program, the end user system interacts with a front-end application program executing on a front-end system, the front-end application program acting as a proxy to the back-end application program. The front-end application program receives a request for a debugger tool from the end user system and provides to the back-end system an identification of the end user system. Based on the identification, the back-end system sends a request to start a debugger tool to the end user system, and in response, the end user system establishes a communication channel with the front-end system to use the debugger tool to receive debugging information.

53 Claims, 9 Drawing Sheets

REMOTE DEBUGGING OF SOFTWARE

BACKGROUND

The present invention relates to remote debugging of software.

Large scale business software applications are sometimes categorized in terms of a "front end component" that includes a graphical user interface (GUI) to present data to users and accept data entry from users. Such front end components are customized for specific customers. Another component of such software applications is sometimes referred to as a "back end component" that stores business data and processes the business data according to business logic. The back end component retrieves, generates, and maintains the business data. The back end component is usually responsible for the consistency and correctness of the data. The back end component also can store relationships between the various data. In a typical business software application, the front end component includes application code to display and aggregate data of the back end and provides help to generate requests to the back end for update operations. During development of the software applications, software developers use debugger tools to analyze the execution of the applications and determine whether software code executed correctly.

SUMMARY OF THE INVENTION

In one aspect, the invention features method that includes, from a user system, sending an identification of the user system and an indication that the user system is waiting for a request to start a debugging session; from the user system, sending a notification that a back end functional module is to be debugged, the back end functional module configured to be executed at an application server; from the user system, requesting a front end client program to be executed at a client server, causing the client program to request service from the functional module at the application server; at the user system, receiving a request to start a debugging session; and at the user system, providing a user interface to communicate with the application server using remote function calls to allow information related to debugging the functional module to be displayed.

This and other aspects of the invention include one or more of the following features. The method includes using the client program to access the functional module through a service manager, the service manager providing a service interface to allow partial separation of software development for the client program and software development for the functional module. The back end functional module processes back end data that is not directly accessible to the client programs. The client program indirectly accesses the back end data using generic commands provided by the service manager, the generic commands causing the service manager to interact with the back end functional module to access the back end data. The back end functional module includes at least one of a query service provider, an aspect service provider, a transaction service provider, a locking service provider, an action service provider, and a query relation service provider. The user interface includes a graphical user interface. The graphical user interface includes an interface designed to interact with an SAP system. The client server communicates with the application server through a gateway, the client server sending remote function calls to the gateway to access services of the functional module. The user system sends a notification to the gateway that the back-end functional module is to be debugged. The method includes sending a request from the gateway to the user system to request the user system to start a debugging session. Requesting the front-end client program to be executed at the client server includes establishing an HTTP session between the user system and the client server so that results generated by the client program are transmitted to the user system through the HTTP session. The method includes executing a web browser program to display results generated by the client program. The client server includes a Java engine.

In another aspect, the invention features method for debugging one of a plurality of back-end functional modules each configured to be executed on one of a plurality of application servers and to service front-end client programs configured to be executed at client servers, each application server associated with a gateway. The method includes, at a first gateway, receiving a notification from a remote function call server executing at a user system that the remote function call server is waiting for a request to start a debugging session; at a second gateway, receiving a request from a client server, the request requesting service by a back-end functional module configured to be executed at an application server associated with the second gateway; establishing a communication link between the application server and the first gateway; and sending a request from the first gateway to the remote function call server to start a debugging session to debug the back-end functional module.

This and other aspects of the invention include one or more of the following features. The method includes, in response to receiving the request requesting service by the back-end functional module, using the application server to search for a gateway that received a notification that a remote function call server is waiting for a request to start a debugging session to debug the functional module. The method includes sending information related to debugging the functional module to a user interface executing at a user system.

In another aspect, the invention features a method that includes providing services to an end user at an end user system from a front-end application executing on a front-end device acting as a proxy to a back-end application executing on a back-end device; receiving a request for a debugging tool from the end user system; providing to the back-end device an identification of the end user system; and establishing a communication channel between the back-end device and the end user system to use the debugging tool.

This and other aspects of the invention include one or more of the following features. The method includes displaying a graphical user interface on the end user system to show information provided by the back-end. The information includes information used to analyze performance of the back-end application. The back-end application includes a module for providing information related to customer relationship management. The debugging tool includes a graphical user interface configured to interact with an SAP system. The back-end application includes a module for providing information related to product lifecycle management. The back-end application includes at least one of a query service provider, an aspect service provider, a transaction service provider, a locking service provider, an action service provider, and a query relation service provider. The front-end application communicates with the back-end application through an interface layer that allows the front-end application to be modified independently of the back-end application. A debugging subroutine stops the execution of the back-end application upon detection of a break point in the back-end application. The identification includes providing the identification of the end user system to a gateway associated with the back-end device.

Providing the identification includes providing the identification using a debug method. Providing the identification includes providing an argument specifying whether a debugging function is activated. Providing the identification includes providing an argument specifying a particular back-end module to be debugged. Providing the identification includes providing an argument specifying a computer for displaying the parameters related to execution of the back-end application.

In another aspect, the invention features a method that includes receiving identification information that identifies a first computer which sends an indication that a back end functional module to be executed at a back end server is to be debugged; at a second computer, using a second debugger tool to debug a front end application program executing at the second computer, the front end application program requesting service from the back end functional module and sending the identification information to the back end server to cause the back end server to start a first debugger tool to debug the back end functional module, the first debugger tool using the identification information to connect to the first computer and send debugging information to the first computer.

This and other aspects of the invention include one or more of the following features. The method includes, from the first computer, sending an indication that the first computer is waiting for a request to start a debugging session. The method includes, at the first computer, receiving a request to start a debugging session and providing a user interface to communicate with the back end server using remote function calls to allow information related to debugging the functional module to be displayed at the first computer.

In another aspect, the invention features a method that includes providing services to an end user at an end user system from a front-end application program executing on a front-end device acting as a proxy to one or more instances of a back-end functional module executing on a back-end server; receiving a request from the end user system for debugging a particular instance of the back-end functional module; providing to the back-end server an identification of the end user system and an indication that the particular instance of the back-end functional module is to be debugged to cause a debugger tool to be executed at the back-end server to interrupt execution of the particular instance of the back-end functional module based on the indication, and not interrupt execution of other instances of the back-end functional module; and establishing a communication channel between the back-end server and the end user system to allow the debugger tool to send information related to debugging of the particular instance of the back-end functional module to the end user system.

This and other aspects of the invention include one or more of the following features. The back end functional module processes back end data that is not directly accessible to the front-end application program. The method includes using the client program to access the functional module through a service manager, the service manager providing a service interface to allow partial separation of software development for the front-end application program and software development for the back-end functional module.

In another aspect, the invention features an apparatus that includes a back-end server including a back-end application program and a debugging tool that generates debugging information to an end-user computer with which the back-end server communicates; and a front-end server in communication with the end-user computer and the back-end server, the front-end server including a front-end application program that requests service from the back-end application program to provide service to the end-user computer. The back-end server receives an indication that the back-end application program is to be debugged, and in response to a request to initiate the debugging tool, the back-end server is provided with an identification of the end-user computer that enables the back-end device to establish a communication channel between the back-end server and the end-user computer to use the debugging tool.

This and other aspects of the invention include one or more of the following features. The end-user computer includes a graphical user interface. The back-end application program includes a module for providing information related to customer relationship management. The back-end application program includes a module for providing information related to product lifecycle management. The front-end server communicates with the back-end server through an interface layer that allows the front-end application program to be modified independently of the back-end application. The debugging tool stops the execution of the back-end application program upon detection of a break point in the back-end application program. The debugging tool receives an argument specifying a hostname of the end-user computer. The debugging tool receives an argument specifying a name of a back-end service module to be debugged. The debugging tool includes SAPGUI for debug.

In another aspect, the invention features a computer program product, tangibly embodied in an information carrier, for remote debugging, the computer program product being operable to cause a data processing apparatus to send an identification of the data processing apparatus and an indication that the data processing apparatus is waiting for a request to start a debugging session; send a notification that a back end functional module is to be debugged, the back end functional module configured to be executed at a back end server; request a front end client program to be executed at a client server, causing the client program to request service from the functional module at the back end server; receive a request to start a debugging session; and provide a user interface to communicate with the application server using remote function calls to allow information related to debugging the functional module to be displayed.

In another aspect, the invention features a computer program product, tangibly embodied in an information carrier, for remote debugging one of a plurality of back-end functional modules each configured to be executed on one of a plurality of application servers and to service front-end client programs configured to be executed at client servers, each application server associated with a gateway, the computer program product being operable to cause a first gateway of the back end system to receive a notification from a remote function call server executing at a user system that the remote function call server is waiting for a request to start a debugging session; a second gateway of the back end system to receive a request from a client server, the request requesting service by a back-end functional module configured to be executed at an application server associated with the second gateway; the application server to establish a communication link with the first gateway; and the first gateway to send a request to the remote function call server to start a debugging session to debug the back-end functional module.

This and other aspects of the invention include one or more of the following features. The computer program product is operable to cause the application server, in response to receiving the request requesting service by the back-end functional module, to search for a gateway that received a notification that a remote function call server is waiting for a request to start a debugging session to debug the functional module. The computer program product is operable to cause a debugger tool to send information related to debugging the functional module to a user interface executing at a user system through the gateway that received the notification.

In another aspect, the invention features a computer program product, tangibly embodied in an information carrier, for remote debugging, the computer program product being operable to cause a data processing apparatus to provide services to an end user at an end user system from a front-end application executing on a front-end device acting as a proxy to a back-end application executing on a back-end system; receive a request for a debugging tool from the end user system; provide to the back-end system an identification of the end user system; and establish a communication channel between the back-end system and the end user system to use the debugging tool.

This and other aspects of the invention include one or more of the following features. The computer program product is operable to cause the data processing apparatus to provide the identification of the end user system to a gateway associated with the back-end system. The computer program product is operable to cause the data processing apparatus to provide an argument to the back-end system specifying a particular back-end module to be debugged.

In another aspect, the invention features a computer program product, tangibly being operable to cause a data processing apparatus to receive identification information that identifies a first computer which sends an indication that a back end functional module to be executed at a back end server is to be debugged; at a second computer, use a second debugger tool to debug a front end application program executing at the second computer, the front end application program requesting service from the back end functional module and sending the identification information to the back end server to cause the back end server to start a first debugger tool to debug the back end functional module, the first debugger tool using the identification information to connect to the first computer and send debugging information to the first computer.

This and other aspects of the invention include one or more of the following features. The computer program product is operable to cause the first computer to send an indication that the first computer is waiting for a request to start a debugging session. The computer program product is operable to cause the first computer to receive a request to start a debugging session and providing a user interface to communicate with the back end server using remote function calls to allow information related to debugging the functional module to be displayed at the first computer.

In another aspect, the invention features a computer program product, tangibly embodied in an information carrier, for remote debugging, the computer program product being operable to cause data processing apparatus to provide services to an end user at an end user system from a front-end application program executing on a front-end device acting as a proxy to one or more instances of a back-end functional module executing on a back-end server; receive a request from the end user system for debugging a particular instance of the back-end functional module; provide to the back-end server an identification of the end user system and an indication that the particular instance of the back-end functional module is to be debugged to cause a debugger tool to be executed at the back-end server to interrupt execution of the particular instance of the back-end functional module based on the indication, and not interrupt execution of other instances of the back-end functional module; and establish a communication channel between the back-end server and the end user system to allow the debugger tool to send information related to debugging of the particular instance of the back-end functional module to the end user system.

These and other embodiments may have one or more of the following advantages. Automatic cache consistency between a service-user and a service provider can be implemented. Clear expectations about the effects of a service invocation can be managed. Less internal knowledge about the operations of the services in underlying components is required. There can be independent software lifecycles for service providers and service consumers. Services provided by a service-based software architecture can be reused for different situations. Generic engines in the software architecture can combine services for new applications.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
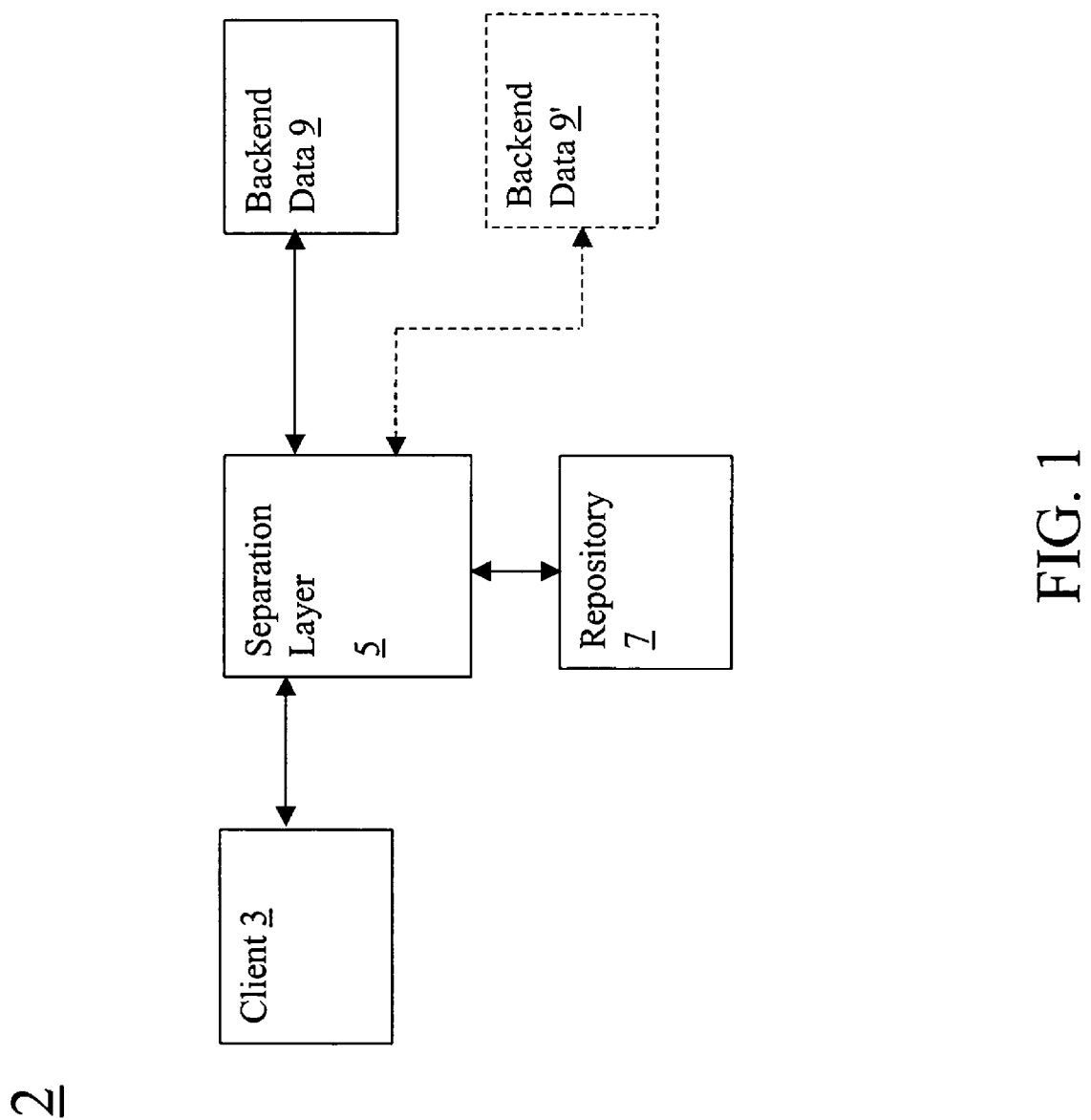
FIG. 1 is a block diagram of an example logical representation of a business software application.

FIG. 1 illustrates an overview logical representation of a business software architecture 2, which includes a client 3, a separation layer 5, a repository 7 and backend data 9 and 9'. Client 3 provides a user interface (UI) that enables a user to interact with the backend data 9 and/or 9'. Backend data 9 and 9' can be associated with different backend applications and/or can be arranged and formatted differently from each other. Separation layer 5 separates the front end user interface provided by client 3 from the back end data 9 and 9'. This separation enables client 3 to interact with backend data 9 and 9' in a consistent and similar manner, regardless of the formatting or application-associated differences between backend data 9 and 9'. In other words, separation layer 5 provides a canonical interface to backend data 9 and 9' so that client 3 is configured to interact with separation layer 5 and only needs to be updated if separation layer 5 changes. Changes to backend data 9 and 9' do not necessitate an update to client 3. Further, separation layer 5 is scalable and configured to handle changes and growth to backend data 9 and 9' and any other disparate backend data and backend services that are further connected to separation layer 5.

As described in more detail below, separation layer 5 is based on a meta model that defines how backend data (e.g., 9 and 9') are represented in separation layer 5. Meta data is stored in repository 7 that describes how the backend data 9 and 9' fit into the meta model representation. Client 3 interacts with backend data 9 and 9' using a generic command set defined by separation layer 5. As described in more detail below, separation layer 5 accesses service providers that perform the generic commands from client 3, using the meta data in repository 7, to effect the requested manipulation of backend data 9 and 9'. The service providers are configurable so that different service providers can be used for different backend data 9 and 9'. Separation layer 5 includes an interface (e.g., a service manager) that hides the characteristics of the corresponding backend data 9 and 9' and also the granularity and distribution of the implementation (i.e., the service providers).

Figure 2:
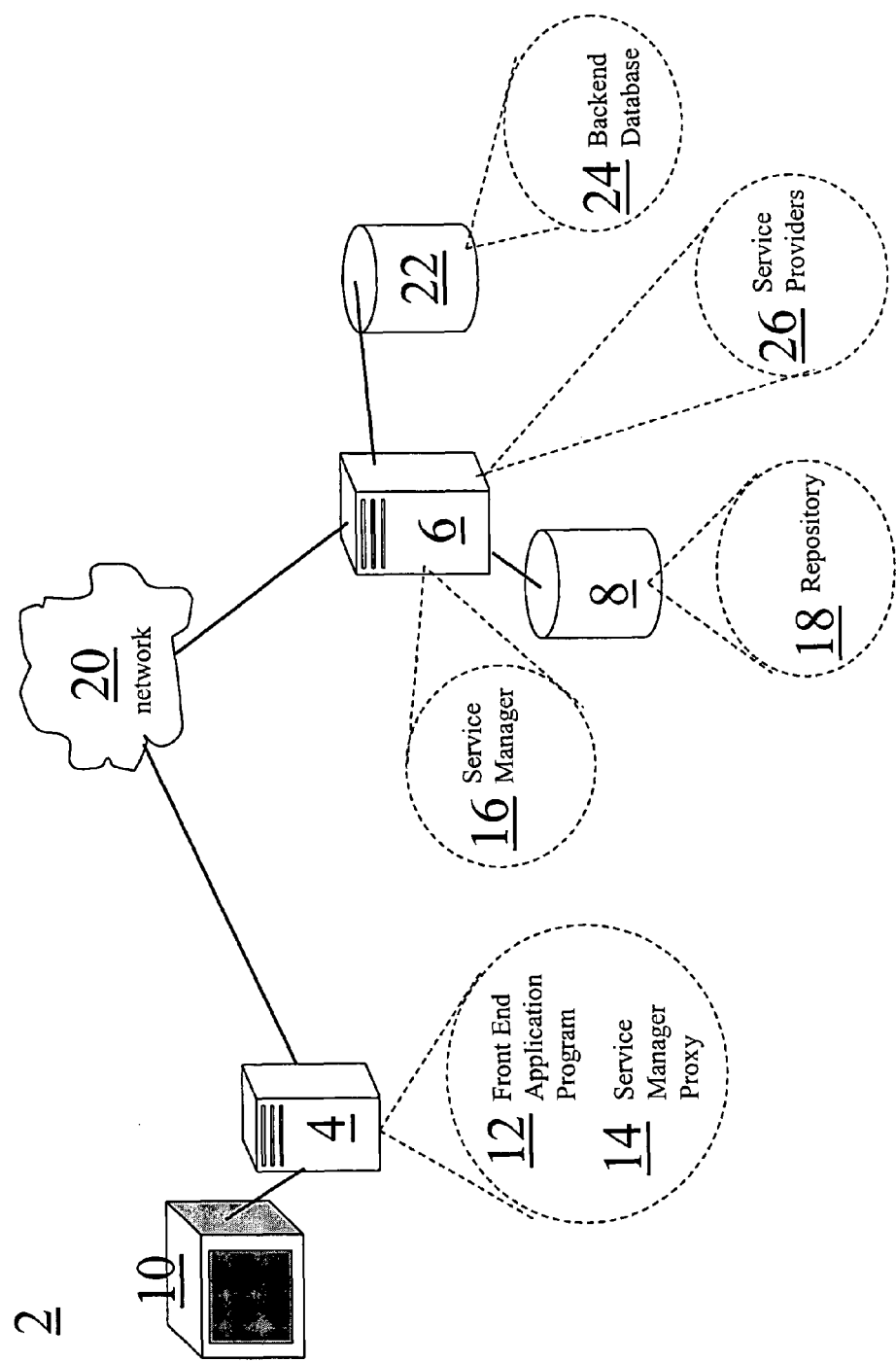
FIG. 2 is a view of a network configuration for a business software application.

FIG. 2 illustrates an example implementation of the business software architecture 2. As shown in FIG. 2, the business software architecture 2 includes a first computer 4 and a second computer 6. The computers 4 and 6 each can include a processor, a random access memory (RAM), a program memory (for example, a writable read-only memory (ROM) such as a flash ROM), a hard drive controller, a video controller, and an input/output (I/O) controller coupled by a processor (CPU) bus. The computers 4 and 6 can be preprogrammed, in ROM, for example, or the computers 4, 6 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs embodying the present invention, and data. The I/O controller is coupled by an I/O bus to an I/O interface. The I/O interface receives and transmits data in analog or digital form over communication links, e.g., a serial link, local area network, wireless link, or parallel link. Also coupled to the I/O bus are a display and a keyboard. Alternatively, separate connections (separate buses) can be used for the I/O interface, display, and keyboard.

A network 20 connects computers 4 and 6. The network 20 is any form or medium of digital data communication, e.g., a communication network. Examples of communication network 20 include a local area network ("LAN") and a wide area network ("WAN"), e.g., the Internet.

Computer 4 executes instructions of a front end application program 12. Application program 12 represents a front end component of the business software architecture 2. Service manager 16, running on computer 6, is a service layer between the front end application program 12 and a set of back end service providers 26. Service manager 16 provides a service interface to front end application program 12 to enable indirect interface allows for a partial separation of software development for front end application program 12 and the set of back end service providers 26.

Computer 6 includes a data storage device 22 that stores a back end database 24 containing data that can be used by the set of back end service providers 26. Computer 6 also includes a data storage device 8 containing an information repository 18 that defines and describes the services provided by the set of back end service providers 26. The meta data in repository 18 is organized according to a meta model.

In general, a meta model is a collection of "concepts" that are the vocabulary with which a certain domain can be described. Meta models typically are built according to a strict rule set, which in most cases is derived from entity-relationship-attribute or object-oriented modeling. The front end application program 12 can access (and interpret according to the strict rule set) the contents of repository 18 via the service manager 16. These services support the functionality of application program 12 and include retrieving and reading data in addition to modifying stored data. The service providers 26 can access or modify stored data in backend database 24 to provide services to front end application program 12. To provide the services, the set of back end service providers 26, upon request from the front end application program 12, either access or modify stored data in backend database 24 or calculate new data.

The repository 18 defines a syntax for requesting services provided by the set of back end service providers 26 and semantically describes the services. As front end application program 12 executes it can use this syntax and semantic description from the repository 18 (accessed through the service manager 16) to determine what services front end application program 12 should use to meet its requirements. This syntax and semantic description for stored or computed backend data can be referred to as "meta data". This stored or computed backend data is conceptually organized using object-oriented terminology in terms of business objects, where each business object is an instance of a class or data entity type. In one example, a class of business objects refers to a relational database table where each row of data in the table represents the data for a business object. In this example, each field in the table represents an attribute of the business object class. In another example, there is a class of business objects that partially refers to a relational database table such that some of the fields in the table represent attributes of the business object class and other fields are computed upon request.

In the business software architecture 2, services provided to front end application program 12 are focused on data (i.e., data-centric) so the description of these services in repository 18 is also data-centric. Thus, the meta data in repository 18 is structured around representations of classes of these business objects. This meta data includes aspects, or descriptions of these representations of business object classes, and descriptions of available operations on aspects such as select, insert, update, delete, select by relation, and update fields that are provided by service providers 26. Each description of these aspects includes data attributes as well as actions that can be requested to be executed by the set of backend service providers 26 on instances of these aspects.

Classifications of data, relations between data classes, prebuilt queries for accessing data, and other descriptions of data provided by the set of backend service providers 26 are represented by repository 18. This representation, or meta data, of data (e.g., stored in backend database 24) provided by the set of backend service providers 26 describes different abstract types or classes of data in backend database 24 and how different data classes relate to each other. Objects are instances of these different abstract types. Meta data is information about data rather than content of the data. The meta data also defines a set of pre-built queries that can be executed on the data in database 24.

The semantic description in repository 18 can enable front end application program 12 to determine which services to request from service manager 16. These services often take the form of requesting data to display. Front end application program 12 reads the meta data in repository 18 and can flexibly request data organized in different ways that are specified by the meta data. For example, two service managers 16 with two different repositories 18 handle services that determine prices of books for companies A and B. For A and B, book prices are represented by different aspects with different data fields. Front end application program 12 reads A's repository 18 to obtain descriptions of data (including a price) concerning a particular book from A's service providers 26. Front end application program 12 reads B's repository 18 to obtain descriptions of data (including a price) concerning a particular book from B's service providers 26. Front end application program 12 is able to request and display the information from A's service provider 26 and the information organized differently from B's service provider 26 to present the book price information to a user.

For requesting the services described by the semantic description in repository 18, service manager 16 provides a canonical interface for services on the business objects in the backend. This canonical interface includes a set of standard operations on the business objects. Such standard operations on the business objects include select, insert, update, delete, select by relation, and update fields. These standard operations are intended to be easy to understand and use. The usage of these standard operations is understood through the strict rule set of the meta model of the repository 18. Furthermore, the repository 18 also includes documented modeling of the side effects of the usage of the operations. The side effects for an operation model which stored business objects are affected by executing the method. For example, "delete" usually has an effect on specific stored business objects. Other standard methods are more specialized and support functionality for transactions between front end application program 12 and service manager 16.

The canonical interface provided by the service manager 16 also includes specialized actions that are defined for specific classes of business objects and queries that can be defined for clusters of classes of business objects. The clusters are modeled as service modules (described in more detail below) in the meta data. These actions and queries are also defined in the meta data of the repository 18.

During execution, front end application program 12 issues service requests to service manager 16, service manager 16 checks the requests for consistency with the meta data in repository 18, and then the service manager 16 passes the requests to back end service providers 26 according to the meta data in the repository database 18. The manner of implementing the set of back end service providers 26 and data in database 24 is independent of application 12, with back end service providers 26 and data in database 24 conforming to the definitions and descriptions of the meta data in the repository 18. Database 24 can be a relational database. However, database 24 can be modified to use a different mode of data organization other than a relational database and front end application program 12 does not need to be modified if back end service providers 26 and data in database 24 still conform to the meta data in the repository 18. One such different mode of data organization for database 24 can be an object-oriented database.

Front end application program 12 provides user interfaces displayed on monitor 10. Front end application program 12 provides application code to display and aggregate the data of the set of backend service providers 26. Front end application program 12 generates requests, via service manager 16, to the set of backend service providers 26 for standard operations such as select, insert, update, delete, and execute in addition to more specialized operations. Front end application program 12 is interaction-centric, focused on aggregating data of the back end service providers 26 and combining interactive steps into a flow of screens and syndicated screen elements.

Front end application program 12 contains screen-flow logic of User Interface (UI) oriented applications and front end application program 12 binds a UI to the meta data in repository 18. Front end application program 12 can be indirectly bound to a specific set of backend services by back end service providers 26 via descriptions of the services in the metadata of the repository 18. Front end application program 12 can also be formed from various generic interaction-centric front-end layers that are only bound by configuration to a highly standardized service layer by service manager 16 serving as an intermediary to back end service providers 26.

In some implementations, the front end application program 12 is not restricted to a program having a (graphical) user interface. Generally any application can use services provided by the set of backend service providers 26. Example applications include a batch process that modifies or analyzes data. For instance, the front end application program 12 can be an application that automatically calculates proposals for paying incoming invoices may be based on the same encapsulation of business logic as an UI for manually maintaining payment information.

In some implementations, a service manager proxy 14 gives the front end application program 12 a buffered access to a service interface provided by service manager 16. Service manager proxy 14 is a server on computer 4 that acts as an intermediary between the front end application program 12 and the service manager 16 so that the business software architecture 2 can ensure security, administrative control, and caching service. The service manager 16 offers a queuing functionality, which is used by the front end application program 12 to bundle several service requests or commands (resulting in service methods) into a single service method queue in order to save round trips. Service manager proxy 14 allows front end application program 12 and service manager 16 to be separated onto different computers 4, 6. Furthermore, this can allow service manager 16 and the set of backend service providers 26 to be distributed over multiple computers.

Figure 3:
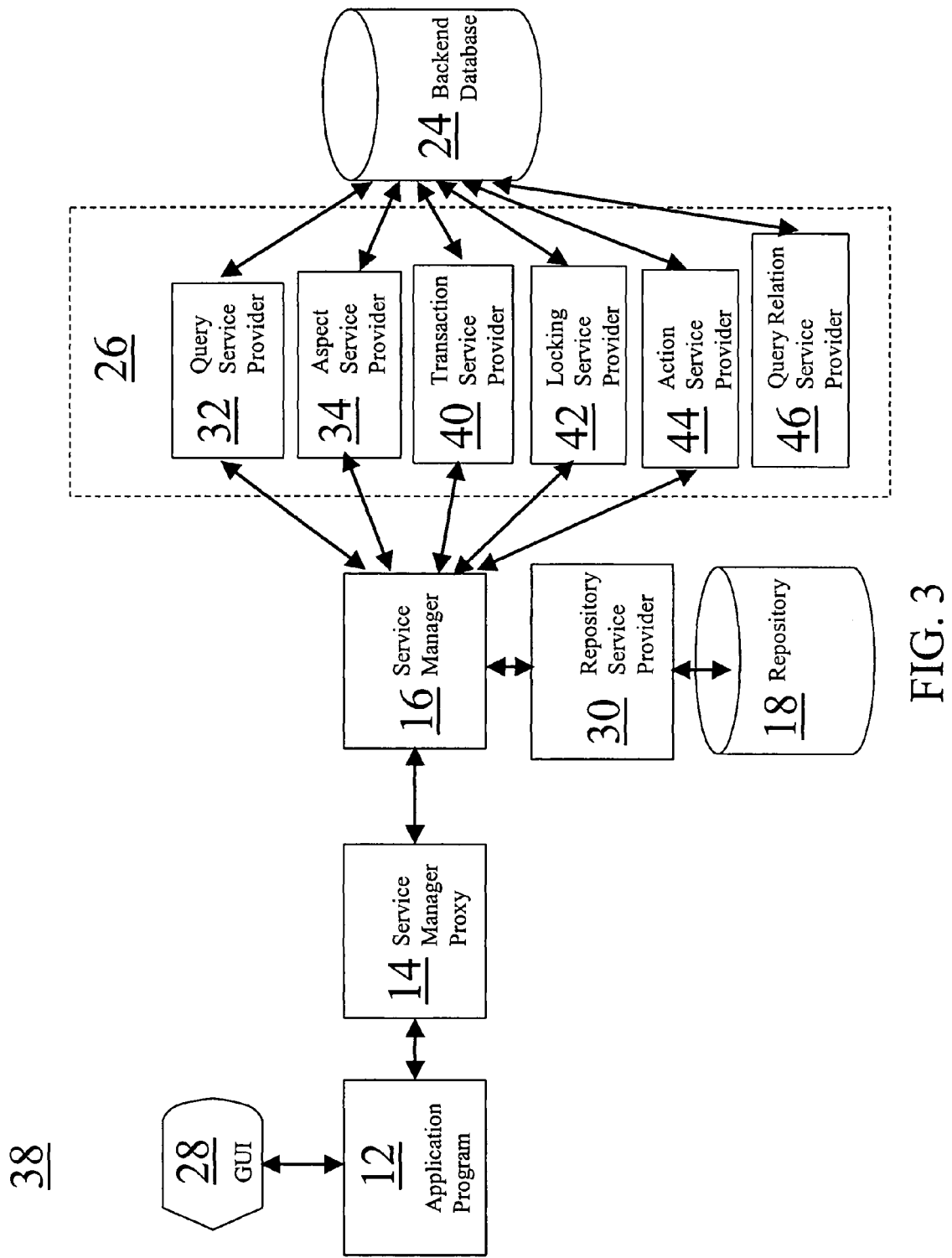
FIG. 3 is a block diagram of the business software application of FIG. 1.

As shown in FIG. 3, the service manager 16 provides an interface (defined by the meta data in repository 18) to front end application program 12 that hides the characteristics of the corresponding back end service providers from the set of backend service providers 26 and data in database 24. Front end application 12 uses this interface to display data in graphical user interface (GUI) 28 for interaction with a user. In other cases, front end application 12 uses this interface to automatically calculate data.

The service manager 16 provides the interface to front end application program 12 by receiving and executing requests from front end application program 12 to backend service providers 26. After each receipt of a request by the service manager 16, the service manager 16 delegates the request to one or more service providers 30, 32, 34, 40, 42, 44, and 46. Service provider 30 is an instance of a software class repository service provider. Service providers 32, 34, 40, 42, 44, and 46 represent instances of software classes such as query service provider class (32), aspect service provider class (34), transaction service provider class (40), locking service provider class (42), action service provider class (44), and query relation service provider class (46). The software classes for service providers 32, 34, 40, 42, 44, and 46 can be implemented as ABAP global classes maintained by the ABAP class library using the ABAP development environment available from SAP of Walldorf, Germany. They also can be implemented by any other programming language on any other platform, e.g., Java on Linux or C# on Windows.

Repository service provider 30 handles requests to get or modify meta data from repository 18. Query service provider 32 handles queries on data in backend database 24 from front end application program 12. Aspect service provider 34 handles accessing and modifying data, navigation through relations and calling actions. The aspect service provider 34 has a standard set of methods that correspond to the standard operations on aspects that can be requested from the service manager 16. These standard operations include select, insert, update, delete, select by relation, and update fields. Transaction service provider 40 allows business logic to act on different states of a transaction between front end application program 12 and service providers. Locking service provider 42 enables separation of concurrent accesses on data types in backend database 24. Action service provider 44 enables execution of actions on aspects. Query relation service provider 46 is the interface for the target aspect of a relation. In some examples, service manager 16 can have different multiple instances of service providers 32, 34, 40, 42, 44, and 46 for different elements in repository 18 representing services. Upon receiving a request for a service represented by an element in repository 18, the service manager 16 can look up a name of a service provider (e.g., 32, 34, 40, 42, 44, and 46) in the meta data for the element in repository 18. For example, the meta data describing an aspect in repository 18 defines which aspect service provider 34 is designed to handle services for the aspect. The service manager 16 uses this information in the meta data to direct requests from the front end application program 12 to the appropriate aspect service provider 34. Similarly, the meta data describing a query in repository 18 defines which query service provider 32 is designed to handle services for the query.

In one example, the service manager proxy 14 communicates with service manager 16 using SOAP (Simple Object Access Protocol) messages via network 20. SOAP is a way for a program running in one kind of operating system (such as a Windows® XP Operating system available from Microsoft Corporation of Redmond, Wash.) to communicate with a program in the same or another kind of an operating system (such as Linux) by using the World Wide Web's Hypertext Transfer Protocol (HTTP) and Extensible Markup Language (XML) as mechanisms for information exchange. Since Web protocols are installed and available for use by all major operating system platforms, HTTP and XML provide a solution to a problem of how programs running under different operating systems in a network can communicate with each other. SOAP specifies exactly how to encode an HTTP header and an XML file so that a program in one computer can call and pass information to a program in another computer. SOAP also specifies how the called program can return a response.

The interface provided by the service manager 16 provides requests or commands to front end application program 12. As mentioned previously, standard commands select, insert, update, delete, select by relation, and update fields are standard operations on aspects in the repository 18. These standard operations are provided by aspect service provider 34 and correspond to some of the requests or commands available to front end application program 12. A "Select" command provides a capability such that if the identifiers (or keys) of instances of a data type (possibly stored in database 24) provided by aspect service provider 34 are known, front end application program 12 can select and read the attributes of these instances. An "Insert" command allows front end application program 12 to add new instances of a data type (possibly stored in database 24) provided by aspect service provider 34. A "Select By Relation" command provides a capability that if a data type is known, front end application program 12 can find other data types that have relations to this data type as defined in repository 18. An "Update" command provides a capability to modify instances of data types (possibly stored in backend database 24) provided by aspect service provider 34. A "Delete" command provides the capability to delete one or more selected instances of one or more data types (possibly stored in backend database 24) provided by aspect service provider 34.

An "Execute" action command provides a capability to execute a semantically defined action on one or more instances of one or more data types (possibly stored in database 24) provided by aspect service provider 34. Either the aspect service provider 34 or the action service provider 44 executes the Execute action command.

A "Query" command provides a capability to search and find particular data of interest. The Query command is a method with a fixed set of search parameters and a result set with a defined structure. Queries are defined for particular service modules, or clusters of aspects in the meta data of the repository 18. The query service provider 32 executes a Query command.

Figure 4:
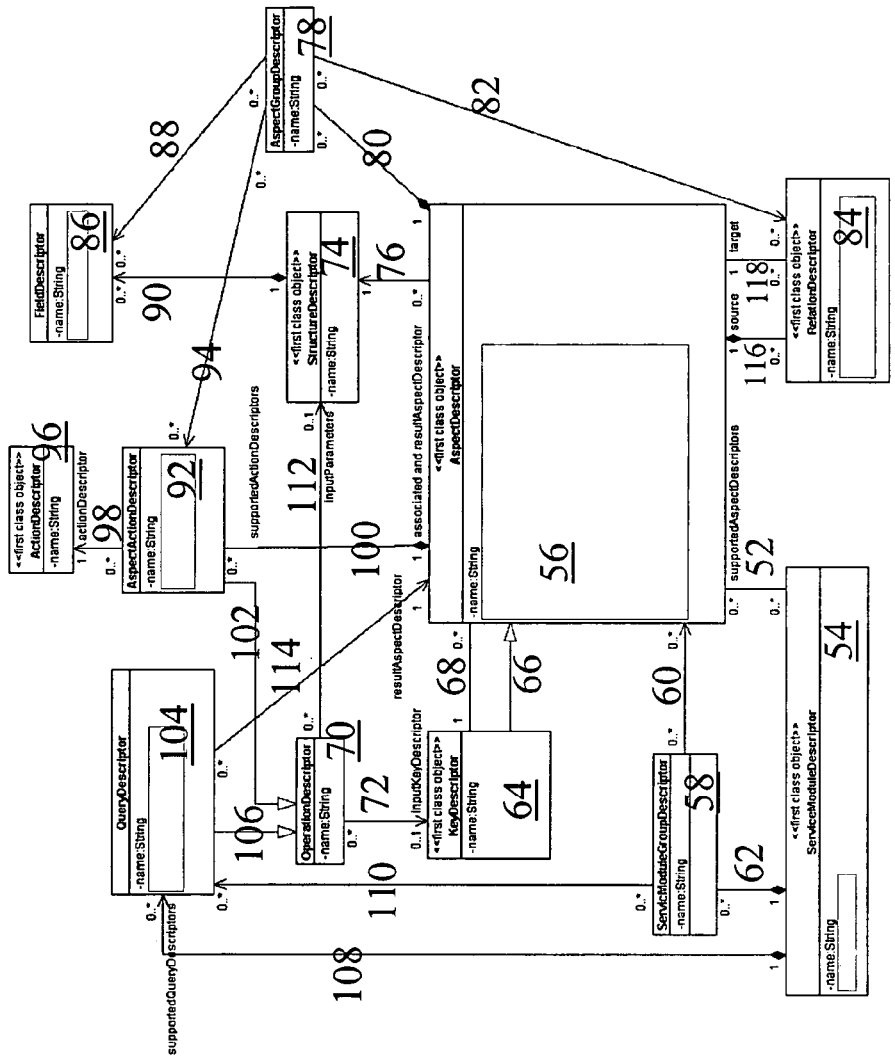
FIG. 4 is a Unified Modeling Language (UML) representation of a structure of a meta model repository.

Data in the meta data is classified into data types or classes. The names of meta model classes representing data types in repository 18 have the suffix "descriptor" to express their belonging to the meta model and to differentiate them from runtime classes used by service manager 16. Descriptors of classes of the meta data of the repository 18 and their class relations are illustrated using an Unified Modeling Language (UML) class diagram 50 in FIG. 4.

Comparing the meta data to data described by relational database terminology, an aspect in the repository 18 can represent a class or an entity type fully or partially stored in backend database 24 and an aspect descriptor 56 includes attributes for the entity type in addition to other information about the entity type. The meta data in the repository 18 also can include relations descriptors 84 defining relations between aspects that can be implemented in database 24 as relationships using foreign keys in relational databases. The meta data also can include service modules descriptors 54 representing service modules that are aggregations of aspects and have predefined queries for accessing data in database 24.

The service modules defined in repository 18 are the building blocks for a set of applications (e.g., front end application program 12) in business software architecture 2 for a particular application area or industry. The service modules encapsulate the implementation and business logic and provide access to data and functionality in a unified canonical way. Examples for service modules in repository 18 are "business partner", "employee", "sales order" or "business activity". Service modules descriptors 54 describe services modules in the data model of the meta data of the repository 18 and how the service modules can be accessed by queries from application program 12.

In repository 18, each defined query is an entry point to search instances of a data type (represented by an aspect) provided by service providers 26 via service manager 16. A "key" is an identifier of an instance of a data type provided by service providers 26. An "action" is a specialized method on one or more instances of an aspect. A "structure" is the aggregation of attributes representing the data of an aspect. A "relation" is the relation between objects of a source and a target aspect. A service module group is associated with a service module and is an aggregation of aspects, relations, and queries. An aspect group is associated with an aspect and is an aggregation of relations, aspect actions, and field descriptors 86. The meta data in the repository 18 also includes a text description of each aspect, query, key, action, structure, relation, service module group, and aspect group. The framework of the meta data in the repository 18 can be described in terms of data types aspect, query, key, action, structure, relation, service module group, and aspect group.

The data model for attributes of aspects, queries, keys, and actions is based on structure descriptors 74. In one example, every aspect has one structure descriptor 74 that defines the data attributes of the aspect. Structure descriptors 74 refer to a data dictionary in repository 18. A data dictionary is a collection of descriptions of the data objects or items in a data model for the benefit of programmers and others who need to refer to them. The structure descriptors 74 can be defined in an XML Schema or in one or more database tables in repository 18.

In one example, structure descriptors 74 defined in repository 18 include flat structures in database tables. A flat structure is a sequence of pairs of attribute names and field descriptors 86 of simple value types such as real, integer, character string, and Boolean. For instance, a structure descriptor 74 defining a two dimensional point can be a list {X, real, Y, real}, where X and Y are attribute names having real values.

In another example of the repository 18, structure descriptors 74 can include nesting and collections of other structure descriptors 74. Nesting of other structure descriptors 74, or sub structures, to enable the generation of larger aspects is useful whenever the use of keys for sub structures defining smaller aspects does not make sense.

For front end application program 12 to access data (possibly stored in backend database 24) from service providers 20 through the service manager 16, instances of business object classes are identified by unique keys within a service module, for example the number of an order or the id of a product. To differentiate between different types of keys for different aspects in a service module, key descriptors define different types of keys. A key descriptor 64 is associated with a structure descriptor 74 that can include more than one data attribute. In one example, every key has a character string attribute. A service module can be associated with different key descriptors 64 for different aspects, e.g., an order key may have another key descriptor 64 as an order item key.

Service module descriptor 54 includes a collection of aspect descriptors. An aspect descriptor refers to exactly one structure descriptor 74 and one key descriptor 64. The structure descriptor 74 includes all key attributes of the corresponding key descriptor 64. Key descriptors 64 are specialized aspect descriptors 56. The key descriptor 64 attribute of a key refers to itself as a self-reference. Examples for aspect descriptors 56 within a simple sales order service module can include: Order, Order Detail, Shipping Address, Billing Address, and Order Item as well as descriptors for key aspects like Order ID and Order Item Key. Service module descriptor 54 specifies the collection of supported aspect descriptors 56. Multiple service module descriptors 54 can be associated with the same aspect descriptor 56.

Aspect descriptors 56 relate to each other specified by relation descriptors 84. A relation descriptor 84 has one source aspect descriptor 56 and one target aspect descriptor 56. In this sense, relation descriptors 84 are directed. Relation descriptors 84 also have an optional cardinality (e.g., 1 . . . n) and a category. Supported categories are Parent-Child or Child-Parent.

A relation descriptor 84 defining a relation between source aspect A and target aspect B means that it is possible to traverse from instances of aspect A to instances of aspect B. For example, given that aspects A and B are implemented in backend database 24 as relational database tables, this means that one or more fields in a table corresponding to aspect A point to the primary key of a table corresponding to aspect B.

The relation descriptor 84 defining a Parent-Child relation from source aspect A and target aspect B means that aspect B depends on the existence of aspect A. For example, given that aspects A and B are implemented in backend database 24 as relational database tables, this means that a primary key of a table corresponding to aspect B is derived from a table corresponding to aspect A.

Relation descriptors 84 are introduced to describe internal navigation from one aspect to another within the same service module, e.g., from an order to the shipping address (cardinality 1 . . . 1) or to the order items (cardinality 1 . . . n) within a sales order service module.

Relation descriptors 84 are independent of service modules and can be reused by different service modules. For an internal navigation or traversal from one data type to another in backend database 24, the visible (usable) relation descriptors of a source aspect descriptor 56 are defined by the service module descriptor 54, which has a list of supported relation descriptors 84. Only those relation descriptors 84 are allowed that have a target aspect descriptor 56 that is also supported by the service module descriptor 54.

Operations for accessing and acting on data types in backend database 24 are described in operation descriptors 70. The structure descriptor 74 defines input parameters of the operation descriptor 70. This structure descriptor 70 also includes an input key descriptor 64 that enables mass and filter operations. Mass operations are operations specified by front end application program 12 on multiple instances of a data type in backend database 24. Filter operations filter the results of an operations, e.g., a query, by the keys defined by the input key descriptor. Input parameters for operation descriptors 70 are optional.

There are three types of operation descriptors 70 i.e., query descriptors 104, aspect action descriptors 92, and action descriptors 96. The aforementioned commands Query and Execute action are defined by operation descriptors 70.

Query descriptors 104 describe query methods that allow searching for instances of aspects within a service module. The query descriptor 104 includes an input parameter, an input key descriptor 64, and a result aspect descriptor 56. The input parameter is a structure descriptor 74 that defines the search parameter structure of the query. The input key descriptor 64 defines which keys may be used for filtering. For example, executing a query defined by a query descriptor 104 with filtering keys results in a list of keys meeting the criteria of the first input. This list of keys is filtered by the set of filtering keys of the input key descriptor 64 so that a subset of the list of keys can be returned. The result aspect descriptor 56 for the query descriptor 104 specifies the type of result of the query, which could be any aspect descriptor 56 that is associated with the service module.

Each service module descriptor 54 has a set of supported query descriptors 104. Service module descriptors 54 cannot use query descriptors 104 defined in other service module descriptors 54 since the query descriptor 104 belongs to one service module descriptor 54.

Aspects provide additional operations (beyond the standard operations select, insert, update, delete, select by relation, and update fields) in the form of actions, which are described by aspect action descriptors 92. Aspect action descriptors 92 are specialized operation descriptors 70 on aspects. The aspect descriptor 56 can have a set of supported aspect action descriptors 92. The input parameter for an aspect descriptor 96 defines the parameter structure of the action. The input key descriptor 64 specifies which keys may be used for mass operations, e.g., an email action may have as input a list of keys representing multiple emails.

Action descriptors 96 can define actions for multiple actions like Print, Email, Fax, Approve, Clear, Cut, Copy, Paste and Cancel. But there may be also more aspect specific actions that can be only used for one or a few aspects. Action descriptors 96 are introduced to enforce reuse. Each aspect action descriptor 92 is associated with an action descriptor 96, where the name and the meaning (textual description) are defined.

Action descriptors 96 specify a name and the meaning (textual description) of the action. They do not specify parameters and are not used to describe polymorphic behavior of operations. They can be used for taxonomies.

A service module group descriptor 58 can be associated with aspect descriptors 56, relation descriptors 84, and query descriptors 104. An aspect group descriptor 78 can be associated with relation descriptors 84, aspect action descriptors 92, and field descriptors 86.

Using object-oriented terminology, diagram 50 includes a zero or more to zero or more relationship 52 between service module descriptor 54 and aspect descriptor 56 since aspects can be grouped together in a service module. Service module group descriptor 58 has a zero or more to zero or more directed relation 60 towards aspect descriptor 56 since aspects can be grouped together in a service module group. Service module group descriptor 58 also has a zero or more to one composite aggregation relationship 62 with service module descriptor 54 because service modules can be grouped together in a service module group. Key descriptor 64, as a specialization of aspect descriptor 56, has an inheritance relationship 66 with aspect descriptor 56. Key descriptor 64 also has a one to zero or more relationship 68 with aspect descriptor 56 since each aspect has a key associated with it to uniquely identify instances of the aspect. Operation descriptor 70 has a directed zero or more to zero or more relationship 72 with key descriptor 64 since operations can include input keys. Aspect descriptor 56 has a zero or more to one relationship 76 with structure descriptor 74 since each aspect descriptor 56 can have a structure descriptor defining its attributes. Aspect group descriptor 78 has a zero or more to one composite aggregation relationship 80 with aspect descriptor 56 since aspect groups are aggregations of aspects. Aspect group descriptor 78 also has a directed zero or more to zero or more relationship 82 with relation descriptor 84 since aspect groups also include relations. Structure descriptor 74 has a one to zero or more ownership relationship 90 with field descriptor 86 since a structure can use many data fields to define itself. Aspect group descriptor 78 also has a zero or more to zero or more ownership relationship 88 with field descriptor 86.

Aspect action descriptor 92 has a zero or more to one relationship 100 with aspect descriptor 56 since aspects can provide actions that can be executed on the aspect. Aspect action descriptor 92 has an inheritance relationship 102 with its superior class operation descriptor 70. Query descriptor 104 also has an inheritance relationship 106 with its superior class operation descriptor 70. Service module descriptor 54 has a one to zero or more relationship 108 with query descriptor 104 since a service module includes queries. Service module group descriptor 58 has a zero or more to zero or more directed relationship 110 with query descriptor 104 since queries can also be grouped together in a service module group.

Operation descriptor 70 has a zero or more to zero or one relationship 112 with structure descriptor 74 since each operation includes input parameters in the form of structures. Query descriptor 104 has a zero or more to zero or one relationship 114 with aspect descriptor 56 since queries include a resulting aspect. Lastly, relation descriptor 84 has zero or more to one relationships 116 and 118 with aspect descriptor 56 since relations have source and target aspects.

To illustrate these descriptors defining a framework of the meta data in repository 18, the framework can be implemented using a fixed set of relational database tables. Other persistence mechanisms (e.g., XML) can also be used. The relational database tables are defined in Tables 1-6 where each row of Tables 1-6 defines a field or column of the relational database tables. The main data type of repository 18 is the aspect. The database tables for describing an aspect are Table 1, SCOL_ASPECT, and Table 2, SCOL_ASP_ACTION.

Table 1 includes descriptions of properties of an aspect. The key field for Table 1, SCOL_ASPECT, is the ASPECT_NAME field because an aspect's name is unique for an aspect. The ASPECT_CATEGORY field indicates if the aspect represents a non-key aspect or a key aspect. The STRUCTURE field indicates a data structure name for data attributes of the aspect. A key is associated with an aspect by putting the key's name in the KEY_ASPECT field. The SERVICE_PROVIDER field defines the aspect service provider 34 for an aspect. The TRANSAC_PROVIDER field defines the transaction service provider 40 for an aspect. The LOCKING_PROVIDER field defines the locking service provider 42 for an aspect. The repository 18 can also have a corresponding table for the description of an aspect.

TABLE 1

SCOL_ASPECT definition

| Field Name | Key | Description |
| --- | --- | --- |
| ASPECT_NAME | X | Name of the aspect |
| ASPECT_CATEGORY | | Aspect type: aspect or key aspect |
| STRUCTURE | | The corresponding data structure of the aspect |
| KEY_ASPECT | | The corresponding key aspect |
| SERVICE_PROVIDER | | The name of the corresponding aspect service provider class |
| TRANSAC_PROVIDER | | The name of the corresponding transaction provider class |
| LOCKING_PROVIDER | | The name of the corresponding locking provider class |

Aspects can provide actions that can be executed on the aspect. Descriptions of the actions are stored in Table 2, SCOL_ASP_ACTION. The actions are uniquely denoted by the aspect name and the name of the action so ASPECT_NAME and ACTION_NAME fields are key fields for SCOL_ASP_ACTION table. The field PARAM_STRUCTURE refers to a data structure that holds input data parameters for the action. The field INPUT_KEY_ASPECT refers to the name of a key aspect that defines the type of keys used to designate which instances of data types in repository 18 are acted upon by the action. The field PROVIDER_CLASS refers to the name of the action service provider class providing the action from the service provider implementing the aspect named in ASPECT_NAME field.

TABLE 2

SCOL_ASP_ACTION definition

| Field Name | Key | Description |
| --- | --- | --- |
| ASPECT_NAME | X | Name of the aspect |
| ACTION_NAME | X | Name of the Action |
| PARAM_STRUCTURE | | The corresponding data structure of the input parameters |
| INPUT_KEY_ASPECT | | The name of the key aspect of the input aspects |
| PROVIDER_CLASS | | The name of the action service provider class |

Aspects can be related with each other. Descriptions of the relations between aspects are stored in Table 3, SCOL_RELATION. A relation is uniquely defined by its name so the key of a relation table is the relation name specified in field RELATION_NAME. For each relation, the field SOURCE_ASPECT defines the aspect that is the source of the directed relation, the field TARGET_ASPECT defines the aspect that is the target of the directed relation, the field TARGET_PROVIDER defines the query relation service provider for the target aspect, the field REL_PARAM_TYPE defines the type of the relation (Parent-Child or Child-Parent), and the field REL_PARAMETER defines the cardinality of the relation. The repository 18 can also have a corresponding table for the description of a relation.

TABLE 3

SCOL_RELATION definition

| Field Name | Key | Description |
| --- | --- | --- |
| RELATION_NAME | X | Name of the relation |
| SOURCE_ASPECT | | Name of the source aspect of the relation |
| TARGET_ASPECT | | Name of the target aspect of the relation |
| TARGET_PROVIDER | | Name of the query relation service provider class |
| REL_PARAM_TYPE | | Type of the relation |
| REL_PARAMETER | | Parameter of the relation |

The properties of a service module are stored in the Table 4, SCOL_SVC_MODULE. Each Service module is uniquely described by its name so SVC_MODULE_NAME field is the key field for a SCOL_SVC_MODULE table. For each service module, the field TRANSAC_PROVIDER specifies the name of the transaction provider 40 for the service module. The repository also has a corresponding table for the description of a service module.

TABLE 4

SCOL_SVC_MODULE definition

| Field Name | Key | Description |
| --- | --- | --- |
| SVC_MODULE_NAME | X | Name of the service module |
| TRANSAC_PROVIDER | | The name of the corresponding transaction service provider class |

Every service module is associated with aspects that can be used within the service module. Names of the aspects that can be used within each service module are stored in the Table 5, SCOL_ASPECT_USE. Since each aspect-service module usage is uniquely described by a name of a service module and the name of an aspect, the fields SVC_MODULE_NAME and ASPECT_NAME are the keys for SCOL_ASPECT_USE table.

TABLE 5

SCOL_ASPECT_USE definition

| Field Name | Key | Description |
| --- | --- | --- |
| SVC_MODULE_NAME | X | Name of the service module |
| ASPECT_NAME | X | Name of the aspect |

Service Modules can provide queries to retrieve data. Descriptions of the queries of a service module are stored in the table SCOL_QUERY illustrated in Table 6 below. The structure of the database table is defined in Table 6. Since each query is uniquely defined by a service module and a query name, the fields SVC_MODULE_NAME and QUERY_NAME are key fields for SCOL_QUERY table. Other fields include RESULT_ASPECT that specifies the name of an aspect defining the data type returned by the query and PARAM_STRUCTURE that specifies a data structure containing the input parameters for the query. For example, a query done on a particular aspect (e.g., specified in field RESULT_ASPECT) associated with the service module can include input parameters that are matched with attributes of instances of the particular aspect and the matching instances are returned as a dataset of keys referring to those instances. The field INPUT_KEY_ASPECT is used to define the key aspect describing keys that could be used as filters for the query. The PROVIDER_CLASS specifies the name of the query service provider 32 associated with each query. The repository also has a corresponding table for the description of a query.

TABLE 6

SCOL_QUERY definition

| Field Name | Key | Description |
| --- | --- | --- |
| SVC_MODULE_NAME | X | Name of the service module |
| QUERY_NAME | X | Name of the query |
| RESULT_ASPECT | | Name of the result aspect of the query |
| PARAM_STRUCTURE | | The corresponding data structure of the input parameters |
| INPUT_KEY_ASPECT | | The name of the key aspect of the input aspects |
| PROVIDER_CLASS | | The name of the corresponding query provider class |

As stated previously, architecture 38 includes six service provider classes (i.e., transaction, query, aspect, action, query relation, and locking) for handling requests from front end application program 12 other than requesting meta data from repository 18 (handled by repository service provider class). To provide services upon request by front end application program 12, service manager 16 directly calls instances of service provider classes. These instances of service provider classes can be located on the same computer (e.g., 6) as service manager 16 or on a different computer.

The locking service provider 42 can be used to implement a generic lock manager for a single aspect or a set of aspects. Each locking service provider 42 needs to be registered with an aspect. The name of the locking service provider 42 is set in SCOL_ASPECT table in LOCKING_PROVIDER field for each aspect. Locking service provider class has two methods that can be called by service manager 16. These are LOCK and UNLOCK. LOCK takes as input a collection of keys representing business objects to be locked, a name of an aspect representing a class of the business objects, and a lock mode. There are various locking modes depending on the locking capability of the target system. Locking mode can specify "E", "S", or "SP". "E" means an exclusive lock or that only one client can obtain the lock. "S" means a shared lock indicating that any clients can lock and no lock exclusive to one client is possible. "SP" means the same as "S" but a subsequent upgrade to an exclusive lock is possible.

LOCK method outputs a Boolean value indicating if the request is rejected or not and also outputs a return code. UNLOCK takes as input a collection of keys representing business objects to be unlocked and a name of an aspect representing a class of the business objects to be unlocked. UNLOCK method also outputs a Boolean value indicating if the request is rejected or not and a return code. A call to UNLOCK is rejected if a transactional buffer is already in a "dirty" state, i.e. if any update, insert, delete operation or an action that is not marked as COL_AFFECTS_NOTHING has been issued since the last CLEANUP call. All locks are removed if the CLEANUP method (described below) of the transaction service provider class is called with reason 'END'.

A transaction is a sequence of information exchange and related work (such as database updating) that is treated as a unit for the purposes of satisfying a request from front end application program 12 to service manager 16 and for ensuring integrity of backend database 24. For a transaction to be completed and changes to database 24 to be made permanent, a transaction has to be completed in its entirety. All of the steps of a transaction are completed before the transaction is successful and the database is actually changed to reflect the new order. If something happens before the transaction is successfully completed, any changes to the backend database 24 must be kept track of so that the changes can be undone.

To handle transactions, the transaction service provider 40 receives notifications on the various states of a transaction between service manager 16, another non-transaction service provider (e.g., 32, 34, 44, 46), and front end application program 12 (or service manager proxy 14 in some cases). These notifications are the transaction service provider 40's methods BEFORE_SAVE, CLEANUP, and SAVE that are called by the service manager 16 during transactions.

The service manager 16 calls the transaction service provider 40's method BEFORE_SAVE to check if the transactional buffer can be saved. This allows checking if the internal state of the non-transaction service provider is ready for being saved. The method BEFORE_SAVE returns false if it is not possible to save the transactional buffer, then the transaction end is aborted. Thus, the BEFORE_SAVE method has a BOOLEAN return parameter. BEFORE_SAVE takes a Boolean as an input parameter REJECTED. The transactional service provider 16 can prevent the following save and commit operations by setting the REJECTED parameter to a non-initial value, i.e. to "true". The method BEFORE_SAVE is called within the service manager 16's sequence of operations triggered by the front-end application 12's SAVE method.

The SAVE method finally triggers the application to save the transactional buffer to the database 24. By calling SAVE, all internal state of the non-transaction service provider is made persistent—either by direct updates or by creating appropriate calls to the update task. If all service providers in architecture 38 have received a SAVE request, service manager 16 commits the transaction.

The CLEANUP method tells all non-transaction service providers to release all their transactional buffers and enqueue-based locks. Calling CLEANUP method communicates that all service providers in architecture 38 need to clean up their internal state. CLEANUP takes a REASON string as an input parameter. The REASON field indicates the reason for the clean up operation. This can be either a 'COMMIT' due to a SAVE-operation or the 'END' of the transaction due to the system closing the transaction automatically. There is no guarantee that cleanup is called under failure conditions.

The action service provider 44 is called by service manager 16 to execute an action for an aspect. The name of action service provider 44 is set in the PROVIDER_CLASS field of SCOL_ASP_ACTION table for a row corresponding to an action. Action service provider 44 has one method EXECUTE. EXECUTE method takes as input parameters an aspect name (ASPECT), a set of keys (INKEYS) specifying which instances of the aspect are acted upon by the action, a generic input parameter (INPARAM), the name of the action (ACTION) to be executed, a set of keys (RELATION_INKEY) for an action acting on an relation, and a name of the relation (RELATION). EXECUTE method returns as output parameters the changed or newly created objects (OUTRECORDS), which have been modified by the action. The objects returned by the OUTRECORDS parameter are transported back to the calling aspect object on the client framework.

The aspect service provider 34 is called by service manager 16 to provide functionality to read and modify the content of one or more aspects. As described previously, an aspect is described by its name (the name is globally unique within a repository), an associated data structure, an associated key (i.e. identifier) structure, a set of implemented actions, a set of outgoing relations, and a set of incoming relations. Aspect service provider 34 has methods EXECUTE, SELECT, INSERT, UPDATE, DELETE, SELECT_BY_RELATION, and UPDATE_FIELDS.

The method EXECUTE is derived from the action service provider 44 and allows executing an action. EXECUTE has as input parameters a name (ASPECT) of the aspect, where the action is to be executed on, keys (INKEYS) of the objects, where the action is executed on, parameters (INPARAM) for the actions, name (ACTION) of the action. Returned parameters include modified or created aspect rows (OUTRECORDS), a Boolean flag (REJECTED) indicating if the request for the method was rejected or not, and return codes (RETURN_CODES).

The method SELECT reads the aspect data associated with the input keys for a given aspect. SELECT has as input parameters a list of keys (INKEYS) encoded within the associated key structure to describe the aspect rows to read and the name (ASPECT) of the aspect. SELECT has as output parameters the result (OUTRECORDS) encoded in the aspect data structure, a Boolean flag (REJECTED) indicating if the request for the method was rejected or not, and return codes (RETURN_CODES).

The method INSERT inserts new data into an aspect. INSERT includes as input parameters a table containing the records to be inserted, if aspect is designed for row wise write operations (INRECORDS). Depending on the aspect description (ExternalKeys=true/false) for the object the keys of the record can be filled or not. Input parameters also include the name (ASPECT) of the aspect, a set of keys (RELATION_INKEY) for an action acting on a relation, and a name of the relation (RELATION). Method INSERT returns a set of records (OUTRECORDS) representing the inserted records together with their keys and possible other modifications that aspect service provider 34 wants to do on the inserted records. For example one modification can be filling out calculated fields for the set of records. The order of the OUTRECORDS rows has to correspond to the order of the INRECORDS rows. Other output parameters include a Boolean flag (REJECTED) indicating if the request for the SELECT method was rejected or not and return codes (RETURN_CODES).

The UPDATE method updates existing instances of an aspect either record wise or field wise. The input parameters for UPDATE method include a table (INRECORDS) containing the instance keys to be updated, if the aspect is designed for row wise write operations. Input parameters also include the name (ASPECT) of the aspect. Parameters returned by the UPDATE method include the updated records (OUTRECORDS) together with their keys and possible other modifications the service provider wants to do. The order of the OUTRECORDS rows has to correspond to the order of the INRECORDS rows. Other output parameters include a Boolean flag (REJECTED) indicating if the request for the SELECT method was rejected or not and return codes (RETURN_CODES).

The DELETE method deletes rows or instances of an aspect in the backend. Input parameters for DELETE method are a list of keys (INKEYS) encoded within the associated key structure to describe the aspect rows to be deleted and the name (ASPECT) of the aspect. Parameters returned by the DELETE method include a Boolean flag (REJECTED) indicating if the request for the SELECT method was rejected or not and return codes (RETURN_CODES).

The SELECT_BY_RELATION method returns, depending on the relation parameter description, either attributes to follow a relation or already another aspect where the source aspect has a relation pointing to the other aspect. Input parameters for SELECT_BY_RELATION are name (RELATION) of the relation to follow, records (INRECORDS) of the source aspect, name of the source aspect (ASPECT), and a structure (OPTIONS) describing various options of the queries for paging etc. Output parameters returned by SELECT_BY_RELATION include the result encoded in the target aspect data structure (OUTRECORDS), an index table showing which row of the OUTRECORDS parameters belongs to which INRECORDS row (INDEX), a description of the result (DESCRIPTION), a Boolean flag (REJECTED) indicating if the request for the SELECT method was rejected or not and return codes (RETURN_CODES).

The UPDATE_FIELDS method updates fields of instances of an aspect. Input parameters include a list of keys (INRECORDS) encoded within the associated key structure to describe the instances of the aspect to be updated. Input parameters also include a table (INFIELDS) containing pairs of names of fields and corresponding values to be updated within a set of records, if the aspect is designed for field wise write operations. If more than one instance of an aspect is to be updated, the additional field index INKEY points to the associated key record. Input parameters also include the name (ASPECT) of the aspect. Parameters returned by UPDATE_FIELDS include the created or changed instances of the aspect (OUTRECORDS) together with their keys and possible other modifications the aspect service provider 34 did. The index of the various OUTRECORDS rows have to be associated to the row indexes in the INFIELDS table. Other parameters returned include a Boolean flag (REJECTED) indicating if the request for the SELECT method was rejected or not and return codes (RETURN_CODES).

Query service provider 32 performs queries. A query in the repository 18 is described in table SCOL_QUERY by the query name in field QUERY_NAME, the associated parameter structure in field PARAM_STRUCTURE, the associated result aspect in field RESULT_ASPECT, and optionally, the associated aspect key, with its unique data structure in field INPUT_KEY_ASPECT. Query service provider 32 has one EXECUTE method that performs a query on one or more aspects. Input parameters include the name of the query (QUERY), a data structure (INPARAM) containing the parameters for the query, and an optional table-type parameter (INKEYS), containing the keys of the aspect rows to which the query shall be restricted. INKEYS can but does not have to consist of the keys of OUTRECORDS returned by EXECUTE method. INKEYS can be of any key aspect structure. Which key structure is associated to the query is specified in the repository 18 in table SCOL_QUERY in field INPUT_KEY_ASPECT. Optionally, other input parameters can be specified including a structure describing various options (OPTIONS) of the queries (e.g., for paging) and SELECTIONS.

Parameters returned by EXECUTE method include a description (DESCRIPTION) of the query, the query result (OUTRECORDS), and a Boolean flag (REJECTED) indicating if the request for the SELECT method was rejected or not.

The EXECUTE method returns the results specified by the query parameters. If the INKEYS table parameter is not empty, the result is restricted to the objects that fulfill the query parameters. INKEYS and INPARAM both restrict the query, but are used in different ways. For example, you could create a query that returns a list of orders not yet delivered. The structure INPARAM specifies that only orders from customers with last names from A-D are to be returned. The INKEYS is a table of all orders that have not yet been delivered. OUTRECORDS contains all orders from the relevant customers that have not been delivered yet. The OUTRECORDS result of a query is a disconnected aspect, that is, the aspect is always read-only. No further backend operations can be performed on this aspect. Only the received keys can be used as parameters to select other aspect rows using the aspect service provider 34.

The query relation service provider 46 implements a routine in a service provider (e.g., aspect service provider 34) for an aspect that is the target of a relation. Methods of query relation service provider 46 are indirectly called from the aspect service provider of the source aspect, if the relation is marked as SOURCE_KEYS or ATTRIBUTES.

Query relation service provider 46 has SELECT_TARGET method. The method SELECT_TARGET has input parameters as follows. Input parameters include the name (SOURCE_ASPECT) of the source aspect. Optionally, the method also includes an input parameter defining a proxy interface (TARGET) to the target aspect's SELECT method. Specifying the TARGET parameter allows calling the SELECT method of the aspect service provider for the target aspect without directly knowing the aspect service provider. This enables a query relation service provider to be added to a service module without knowledge of the aspect service provider for the target aspect.

Another input parameter is the relation (RELATION). Another input parameter is a table of fields (INPARAMS) to describe the relation. To allow mass selection INPARAMS is a table where every row describes a single selection. An INDEX parameter is used to relate the various rows of the INPARAMS structure to the OUTRECORDS rows. Another optional input parameter is a structure (OPTIONS) describing various options of the queries (e.g., for paging).

SELECT_TARGET method returns parameters that include the result encoded with the structure of the target aspect (OUTRECORDS), a description of the query result (DESCRIPTION), and a proxy interface to the target aspects SELECT method. Other output parameters include an index (INDEX) to describe the relation between the INPARAMS records and the OUTRECORDS parameter, a Boolean flag (REJECTED) indicating if the request for the SELECT method was rejected or not and return codes (RETURN_CODES).

The service providers 32, 34, 40, 42, 44, and 46, as described above, enable the following transactional model for the architecture 38. Executing method SELECT of aspect service provider 34 reads from the backend database 24 or reads from a transactional buffer build up in the back-end. Aspect service provider 34 merges data from both sources— the database and its transactional buffer—in a consistent way reflecting the updates made so far in this transaction correctly. Next, executing UPDATE, INSERT, MODIFY, or DELETE methods of aspect service provider 34 builds up a transactional buffer. Before actually changing data in the transactional buffer, the service manager 16 has to acquire a transactional lock on the data and read the data under the protection of a lock. There are exclusive, shared, and shared promotable lock modes available using locking service provider 42 as described previously. Locking has to be accompanied by selecting the locked data again under the protection of the lock. Applications can support optimistic locking by providing time-stamped or otherwise versioned data and merging actual and modified data on the front-end on conflicts.

The BEFORE_SAVE method of the transaction service provider 40 enables all participating service providers to declare if they are ready for saving the transactional buffer. The SAVE method of the transaction service provider 40 finally triggers service manager 16 to save the transactional buffer to the backend database 24.

The CLEANUP method of the transaction service provider 40 tells all service providers (e.g., aspect service provider 34) to release all their transactional buffers and enqueue-based locks. If CLEANUP is called with reason 'END', all locks have to be released. If reason is set to 'COMMIT', each service provider can chose to keep its locks. Aspect service provider 34 must not call COMMIT WORK or ROLLBACK WORK internally on its own. The service manager 16 enforces this by automatically aborting the transaction if aspect service provider 34 is trying to commit a transaction.

The supported locking models and lock policies are as follows. Using policy S, many participants can obtain a shared lock. If a shared lock is obtained on an object, no exclusive lock or SP lock can be obtained. Shared locks can only be used to achieve a consistent view on a larger set of data during read operations. Using policy E, only a single participant can obtain a lock. Using policy SP (shared promotable), many participants can obtain the lock. If a SP lock exists, exclusive locks can only be obtained by participants already having a SP lock on the object. Only one of the participants can upgrade the lock to an exclusive lock. No other participant, who did obtain a lock prior to the upgrade, can upgrade to exclusive even if the first participant did release its lock.

EXAMPLE

The architecture 38 (of FIG. 3) implements a simple task of creating a new customer, receiving the customer's order of one or more products via GUI 28 and submitting the order to a business process. To support this example, backend database 24 can be implemented using a relational database designed according to the definitions in Tables 1-6 above to define lists of customers, addresses, product types, baskets, positions of products in a basket for each order, and orders. In Tables 7-12, key fields headings are denoted with an asterisk. Customers Table 7 defines customers and each customer is uniquely identified by a CustomerId field. Customers Table 7 also includes a NAME field and a foreign key field AddressId that links addresses in an Addresses table to customers.

TABLE 7

| Customers | | |
|---|---|---|
| CustomerId* | NAME | AddressId |
| 1 | John Smith | 1 |
| 2 | David Klein | 2 |

Addresses Table 8 defines addresses having a town and a street. The Address id itself is a valid unique key for an address and the connection between address and customer is done through the Customers Table 7 (AddressId field)

TABLE 8

| Addresses | | |
|---|---|---|
| AddressId* | Town | Street |
| 1 | Athens | Main Street |
| 2 | Louisville | Willow Avenue |

Table 9 defines products having names with key ProductId.

TABLE 9

| Products | |
|---|---|
| ProductId* | Name |
| 1 | Saw |
| 2 | Hammer |
| 3 | Wrench |
| 4 | Screwdriver |

Table 10 defines shopping baskets having customers with key BasketId.

TABLE 10

| Baskets | |
|---|---|
| BasketId* | CustomerId |
| 1 | 2 |
| 2 | 1 |

Table 11 defines positions of orders in baskets and having products. Positions are dependent on the existence of baskets and orders so the primary key for positions is a combination of PositionId, BasketId, and OrderId.

TABLE 11

| Positions | | | |
|---|---|---|---|
| PositionId* | BasketId* | OrderId* | ProductId |
| 1 | 1 | 3 | 2 |
| 2 | 1 | 2 | 3 |
| 3 | 2 | 1 | 4 |

Table 12 defines orders having customers and indicating whether or not each order is submitted with primary key OrderId.

TABLE 12

| Orders | | |
|---|---|---|
| OrderId* | CustomerId | Submitted |
| 1 | 1 | False |
| 2 | 2 | False |
| 3 | 2 | False |

Figure 5:
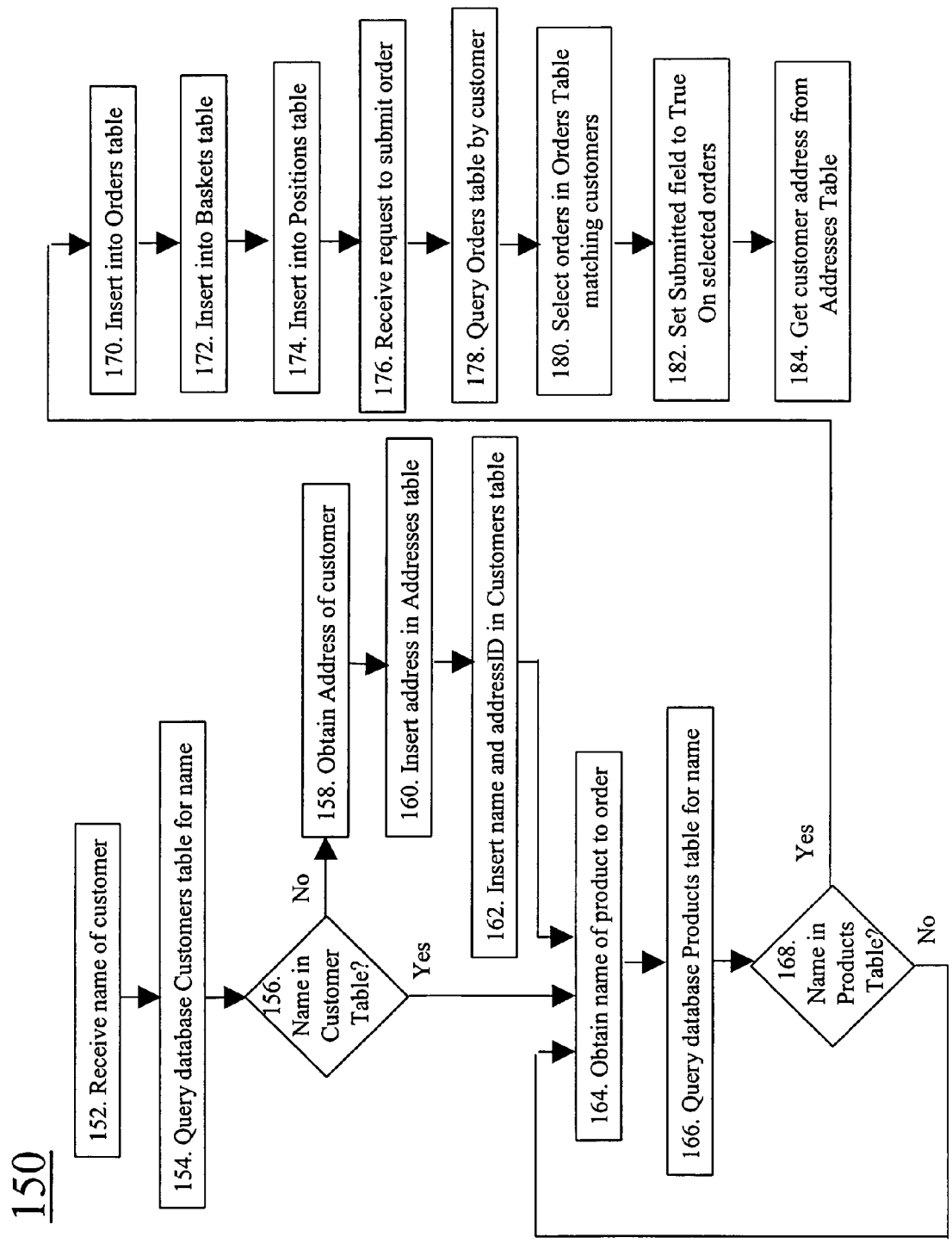
FIG. 5 is a flow diagram of a business process.

As shown in FIG. 5, process 150 defines the database operations on backend database 22 that are needed for this simple task using these tables 7-12. Process 150 includes front end application program 12 receiving (152) a name of a customer. Process 150 includes the business software application querying (154) a database with Customers table (Table 7) for the name in the NAME field. Process 150 includes checking if the customer's name matches (156) a row in the Customers table (Table 7). If no match is made, process 150 includes the business software application obtaining (158) the address of the customer, inserting (160) a new row in the Addresses table (Table 8) with a new AddressID and address, and inserting (162) a new row in the Customers table (Table 7) with a new CustomerId and the AddressID. If a match is made, process 150 includes the business software obtaining (164) a name of a product to order for the customer. Process 150 includes the business software querying (166) the Products table (Table 9) for the product name.

Process 150 includes checking if the product name matches (168) a row in the Products table (Table 9). If a match is made, then process 150 includes the business software inserting (170) a new order in the Orders table (Table 12) with the customer's CustomerId and setting the Submitted field to "False". Otherwise, process 150 returns to obtaining (164) the name of the product to order. Process 150 includes the business software inserting (172) a new basket in the Basket table (Table 10) with the customer's CustomerId.

Process 150 includes the business software inserting (174) a new position in the Positions table (Table 11) with the CustomerId, BasketId, and ProductId. Process 150 includes the business software receiving (176) a request to submit the order. Process 150 includes the business software querying (178) the Orders table (Table 12) by the customer's CustomerId and this query returns orders matching the customer's CustomerId. Process 150 includes the business software selecting (180) orders in the Orders table (Table 12) matching the orders for the customer's CustomerId. Process 150 includes the business software setting (182) the Submitted field in the selected rows in the Orders table (Table 12) to "True". Process 150 includes the business software getting (184) the address of the customer from the Addresses Table 8 for order delivery by querying Customers Table 7 for an AddressId and then querying Addresses Table 8 for a matching AddressId.

Tables 13-19 show tables in one implementation of repository 18 representing meta data for the example database illustrated by Tables 7-12. Tables 13-19 follow the definitions of Tables 1-6 described above such that definitions in rows of Tables 1-6 correspond to columns or fields in Tables 13-19. As with Tables 7-12, key fields in Tables 13-19 are labeled by an asterisk.

Table 13 follows the definition of a SCOL_ASPECT table (defined in Table 1) to define aspects A_Customer, A_Address, A_Product, A_Basket, A_Position, and A_OrderHeader. Each aspect has a corresponding key aspect that defines a unique key for each instance. For example, aspect A_Customer has a key aspect Customer_Key. This key aspect in the meta data repository 18 can correspond to a key for a relational database table in backend database 24. For example, the key for Customers table (Table 7) is CustomerId field. The rows in STRUCTURE field correspond to a data dictionary in Table 19 below. For example, Table 19 can define Customer_Structure to have a NAME field of type CHAR indicating a character string. The rows in SERVICE_PROVIDER field correspond to particular aspect service providers handling services for aspects. In Table 13, all of the aspects are assigned to S_provider aspect service provider (e.g., 34 referring to FIG. 3). The rows in TRANSAC_PROVIDER field correspond to particular transaction service providers 40 handling transactions for aspects. In Table 13, all of the aspects are assigned to T_provider transaction service provider (e.g., 40 referring to FIG. 3). The rows in LOCKING_PROVIDER field correspond to particular locking service providers handling locking for aspects. In Table 13, all of the aspects are assigned to L_provider locking service provider (e.g., 42 referring to FIG. 3).

TABLE 13

Example SCOL_ASPECT table

| ASPECT_NAME* | ASPECT_CATEGORY | STRUCTURE | KEY_ASPECT | SERVICE_PROVIDER | TRANSAC_PROVIDER | LOCKING_PROVIDER |
|---|---|---|---|---|---|---|
| A_Customer | aspect | Customer_Structure | Customer_Key | S_provider | T_provider | L_provider |
| Customer_Key | key aspect | Customer_Key_Table | Customer_Key | S_provider | T_provider | L_provider |
| A_Address | aspect | Address_Structure | Address_Key | S_provider | T_provider | L_provider |
| Address_Key | key aspect | Address_Key_Table | Address_Key | S_provider | T_provider | L_provider |
| A_Product | aspect | Product_Structure | Product_Key | S_provider | T_provider | L_provider |
| Product_Key | key aspect | Product_Key_Table | Product_Key | S_provider | T_provider | L_provider |
| A_Basket | aspect | Basket_Structure | Basket_Key | S_provider | T_provider | L_provider |
| Basket_Key | key aspect | Basket_Key_Table | Basket_Key | S_provider | T_provider | L_provider |
| A_Position | aspect | Position_Structure | Position_Key | S_provider | T_provider | L_provider |
| Position_Key | key aspect | Position_Key_Table | Position_Key | S_provider | T_provider | L_provider |
| A_OrderHeader | aspect | OrderHeader_Structure | OrderHeader_Key | S_provider | T_provider | L_provider |
| OrderHeader_Key | key aspect | OrderHeader_Key_Table | OrderHeader_Key | S_provider | T_provider | L_provider |

Table 14 follows the definition of a SCOL_ASP_ASPECT table (defined in Table 2) to define an action Submit for aspect A_OrderHeader. Field INPUT_KEY_ASPECT specifies the key aspect that is sent by application 14 with the action to specify which instances of aspect A_OrderHeader should be acted upon by the action. Action Submit changes the Submitted field of those instances in backend database 24 to True. No extra parameters are required for this action Submit so PARAM_STRUCTURE field is blank in Table 14. Field PROVIDER_CLASS specifies the aspect service provider 34 (referring to FIG. 3) assigned to each action. In Table 14, action Submit is assigned to aspect service provider S_provider (e.g., 34 referring to FIG. 3).

TABLE 14

Example SCOL_ASP_ACTION Table

| ASPECT_NAME* | ACTION_NAME* | PARAM_STRUCTURE | INPUT_KEY_ASPECT | PROVIDER_CLASS |
|---|---|---|---|---|
| A_OrderHeader | Submit | | OrderHeader_Key | S_provider |

Figure 6:
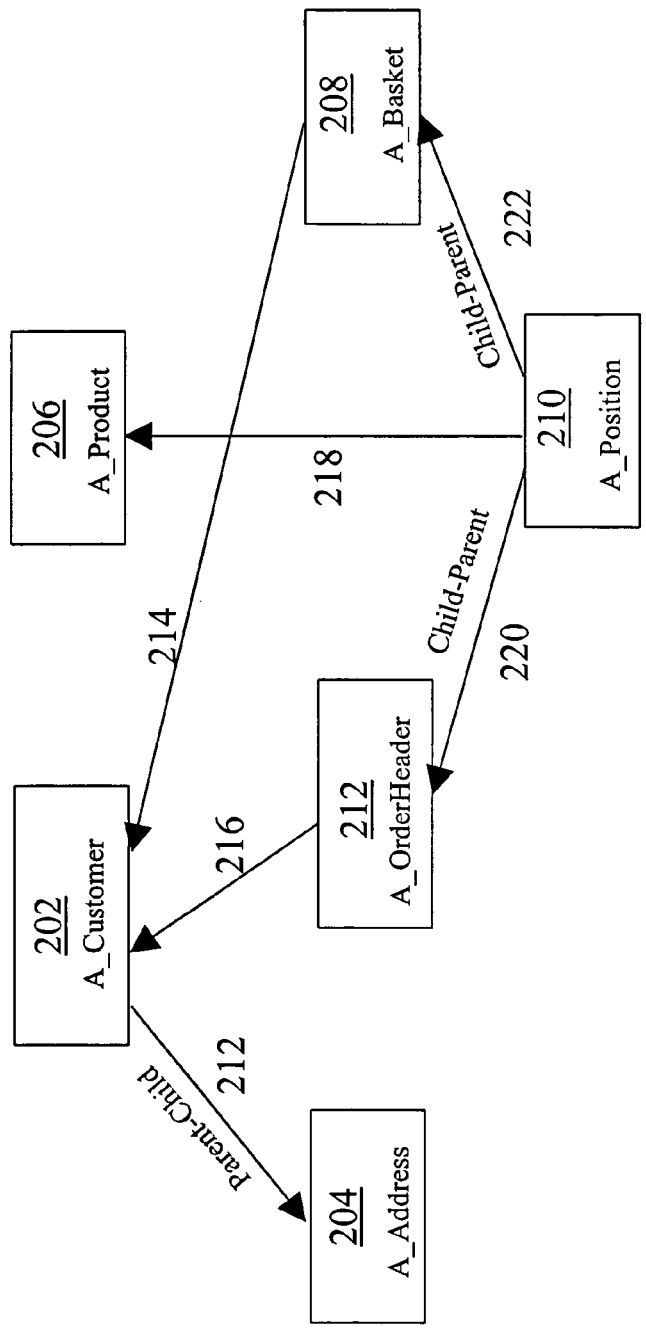
FIG. 6 is a diagram showing relations between different aspects for a business

Table 15 follows the definition of a SCOL_RELATION table (defined in Table 3) to define relations between aspects defined in Table 13. These relations reflect relations between data tables in backend database 24 illustrated by example tables 7-12. These relations between aspects are also illustrated in FIG. 6 for aspect A_Customer 202, aspect A_Address 204, aspect A_Product 206, aspect A_Basket 208, aspect A_Position 210, and aspect A_OrderHeader 112. These relations include R_Customer_To_Address 212, R_Basket_To_Customer 214, R_OrderHeader_To_Customer 216, R_Position_To_Product 218, R_Position_To_OrderHeader 220, and R_Position_To_Basket 222.

TABLE 15

Example SCOL_RELATION Table

| RELATION_NAME* | SOURCE_ASPECT | TARGET_ASPECT | TARGET_PROVIDER | REL_PARAM_TYPE | REL_PARAMETER |
|---|---|---|---|---|---|
| R_Customer_To_Address | A_Customer | A_Address | S_provider | Parent-Child | |
| R_Basket_To_Customer | A_Basket | A_Customer | S_provider | | |
| R_OrderHeader_To_Customer | A_OrderHeader | A_Customer | S_provider | | |
| R_Position_To_Product | A_Position | A_Product | S_provider | | |
| R_Position_To_OrderHeader | A_Position | A_OrderHeader | S_provider | Child-Parent | |
| R_Position_To_Basket | A_Position | A_Basket | S_provider | Child-Parent | |

Table 16 follows the definition of a SCOL_SVC_MODULE table (defined in Table 4) to define example service modules for the example definitions of backend database 24 given in tables 7-12. Table 16 defines service modules S_Customer, S_Product, S_Basket, and S_Order. Field TRANSAC_PROVIDER specifies a transaction service provider 40 (referring to FIG. 3) to each service module. In Table 16, transaction service provider T_provider (e.g., 40, referring to FIG. 3) is assigned to the service modules.

TABLE 16

Example SCOL_SVC_MODULE Table

| SVC_MODULE_NAME* | TRANSAC_PROVIDER |
|---|---|
| S_Customer | T_provider |
| S_Product | T_provider |
| S_Basket | T_provider |
| S_Order | T_provider |

Table 17 follows the definition of a SCOL_ASPECT_USE table (defined in Table 5) to associate service modules (provided by Table 16) with aspects (provided by Table 13).

TABLE 17

Example SCOL_ASPECT_USE Table

| SVC_MODULE_NAME* | ASPECT_NAME* |
|---|---|
| S_Customer | A_Customer |
| S_Customer | A_Address |

TABLE 17-continued

Example SCOL_ASPECT_USE Table

| SVC_MODULE_NAME* | ASPECT_NAME* |
|---|---|
| S_Product | A_Product |
| S_Basket | A_Basket |
| S_Basket | A_Position |
| S_Order | A_OrderHeader |
| S_Order | A_Position |

Table 18 follows the definition of a SCOL_QUERY table (defined in Table 6) to define queries designed to facilitate business process 150 of FIG. 5. For example, QueryByName query associated with S_Customer service module takes a Customer_Stucture as input for the query and a set of customer keys (Customer_Key) that defines which keys may be used for filtering. Field PROVIDER_CLASS specifies which query service provider 32 (referring to FIG. 3) is associated with each service module. In Table 18, query service provider Q_provider (e.g., 32) is associated with each service module.

TABLE 18

Example SCOL_QUERY Table

| SVC_MODULE_NAME* | QUERY_NAME* | RESULT_ASPECT | PARAM_STRUCTURE | INPUT_KEY_ASPECT | PROVIDER_CLASS |
|---|---|---|---|---|---|
| S_Customer | QueryByName | Customer_Key | Customer_Structure | Customer_Key | Q_provider |
| S_Product | QueryByName | Product_Key | Product_Structure | Product_Key | Q_provider |
| S_Basket | QueryByCustomer | Basket_Key | Customer_Structure | Customer_Key | Q_provider |
| S_OrderHeader | QueryByCustomer | OrderHeader_Key | Customer_Structure | Customer_Key | Q_provider |

Table 19 defines a data dictionary for the implementation of repository 18 defined in Tables 13-18. Each row defines a structure having a name and multiple data entries and their types. For example, structure Customer_Structure has one data entry titled "NAME" with a CHAR type indicating a character string. The Customer_Key_Table structure defines a CustomerId key for each customer and also has a CHAR type.

TABLE 19

Example SCOL_STRUCT Table

| STRUCT_NAME* | DATA1 | TYPE1 | DATA2 | TYPE2 |
|---|---|---|---|---|
| Customer_Structure | NAME | CHAR | | |
| Customer_Key_Table | CustomerId | CHAR | | |
| Address_Structure | Town | CHAR | Street | CHAR |
| Address_Key_Table | AddressId | CHAR | | |
| Product_Structure | Name | CHAR | ProductId | CHAR |
| Product_Key_Table | ProductId | CHAR | | |
| Basket_Structure | | | | |
| Basket_Key_Table | BasketId | CHAR | | |
| Position_Structure | | | | |
| Position_Key_Table | PositionId | CHAR | | |
| OrderHeader_Structure | Submitted | CHAR | | |
| OrderHeader_Key_Table | OrderId | CHAR | | |

The database operations described above for process 150 are defined in this implementation of repository 18 as follows. Querying (154), included in process 150, of the Customers database table (Table 7) is described in meta data repository 18 by the QueryByName query associated with aspect service module S_Customer in Table 18. This QueryByName query associated with aspect service module S_Customer is selected because the front end application program 12 has obtained a customer name and service module S_Customer contains aspects with customer names. For example, front end application program 12 can submit query QueryByName associated with service module S_Customer with NAME="John Smith" and no filtering Customer_Key specified to service manager 16. Service manager 16 checks repository 18 to ensure that the query is defined. Service manager 16 then submits the query to Q_provider (e.g., 32) that queries the Customer database table (Table 7) in database 24 and the output is sent back to front end application program 12 is a record set containing CustomerId={1}.

Inserting (160), included in process 150, on Addresses database table (Table 8) and inserting (162), included in process 150, on Customers database table (Table 7) are described by standard Insert operations (described previously) on aspects A_Address and A_Customer, respectively, in the meta data repository 18.

Querying (166), included in process 150, on the Products database table (Table 9) for a product name is described by QueryByName query associated with service module S_Product defined in Table 18. For example, application 12 can submit the query QueryByName associated with service module S_Product with Name="Wrench" and no filtering Product_Key specified to service manager 16. Service manager 16 checks repository 18 to ensure that the query is defined. Service manager 16 then submits the query to Q_provider (e.g., 32) queries database 24 and the output sent back to application 12 is a record set containing ProductId={3}.

Inserting (170, 172, and 174), included in process 150, are defined by insert operations on aspects A_OrderHeader, A_Basket, and A_Position, respectively.

Querying (178), included in process 150, Orders database table (Table 12) by customer is described by the QueryByCustomer query associated with service module S_Order defined in Table 18. For example, front end application program 12 can submit query QueryByCustomer associated with service module S_Order with Customer_Key (CustomerId)={2} and no filtering OrderHeader_Key. Service manager 16 checks repository 18 to ensure that the query is defined. Service manager 16 then submits the query to Q_provider (e.g., 32) that queries database 24 and the output is sent back to application 12 is a record set containing OrderHeader_Key (OrderId)={2, 3}.

Selecting (180), included in process 150, order operation on Orders database table (Table 12) and setting (182) submitted field to true on selected orders are defined by the Execute Submit action (defined in Table 14) on aspect A_OrderHeader in repository 18. For example, front end application program 12 sends the Submit action on aspect A_OrderHeader to service manager 16 with OrderHeader_Key={2, 3}. Service manager 16 then sends the submit operation to S_provider (e.g., 34) that changes the Submitted field in Orders database table (Table 12) to "True" for selected rows corresponding to OrderId={2, 3}.

Getting (184) customer address, included in process 150, from Addresses database table (Table 8) is defined by the standard Select By Relation action on A_Customer aspect. For example, the front end application program 12 sends a Select By Relation action on A_Customer aspect specifying relation R_Customer_To_Address and Customer_Key={2} to service manager 16. Service manager 16 checks the request against repository 18 and passes the request to service provider S_provider (e.g., 34) that looks up foreign key AddressId matching CustomerId={2} and navigates to Addresses table 8. S_provider (e.g., 34) returns a record set containing {Louisville, Willow Avenue} from Addresses database table (Table 8) to application 12 via service manager 16.

Remote Debugger

Figure 7:
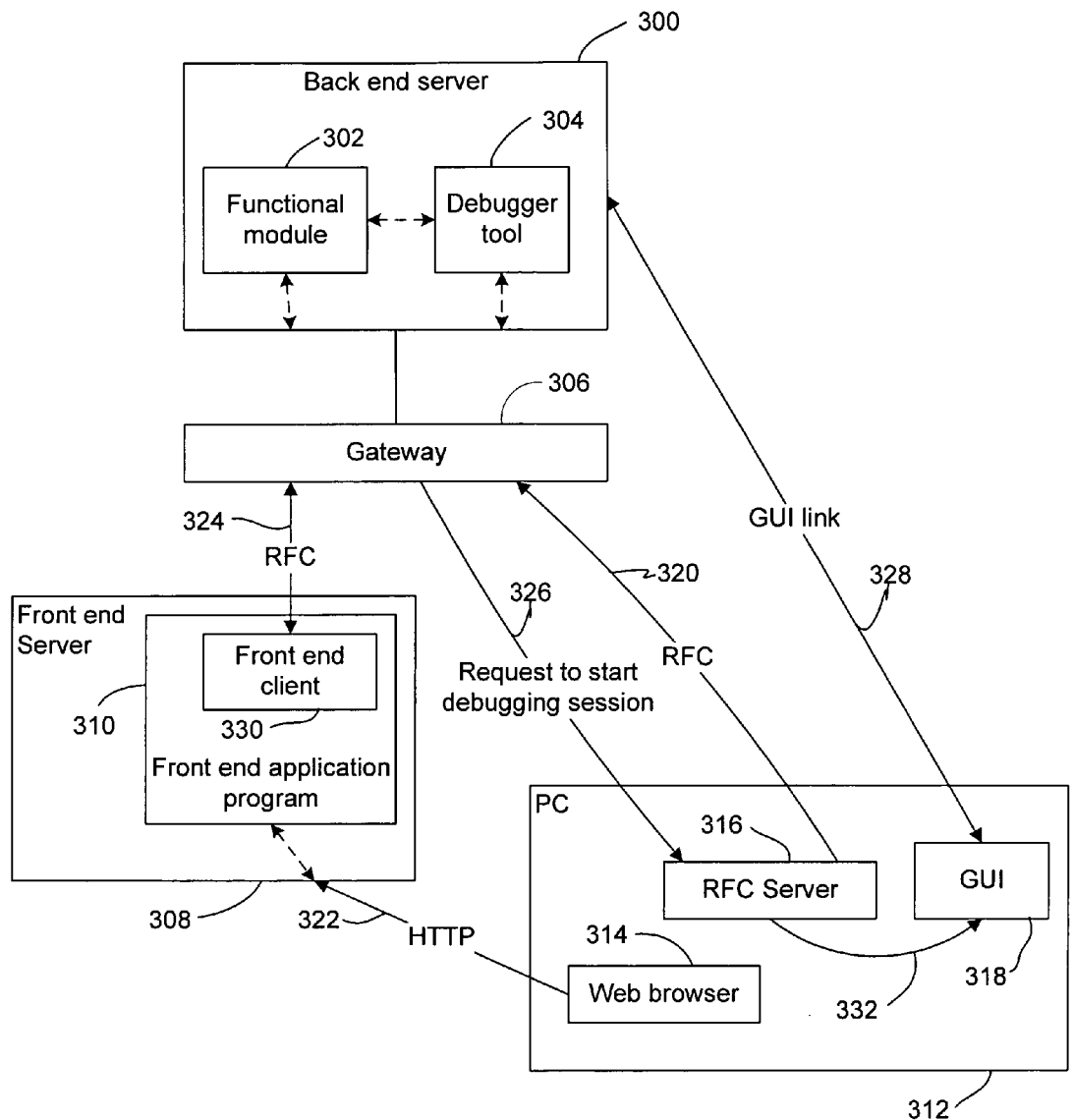
FIGS. 7-9 are network configurations for remotely debugging a software module of the business software application.

FIG. 7 illustrates the use of a debugger tool 304 to debug back end functional modules 302 implemented according to the business software architecture 2 (FIG. 2). A front end application program 310 executes on a front end server 308 that is independent from a back end server 300, which executes the back end functional modules 302. The front end application program 310 serves a remote user (not shown) who uses a web browser 314 on an end user computer 312 to access the front end application program 310. Under the architecture 2, the back end server 300 is ignorant of the end user computer 312 and behaves as if the front end server 308 is the computer that the end user is using. Similarly, the end user computer 312 is ignorant of the back end server 300 and behaves as if the back end functional modules are executed on the front end server 308.

In one example, the front end application program 310 is a Java application, and the front end server 308 is a Java server, such as a Java 2 Platform, Enterprise Edition (J2EE) server. The front end server 308 can also be any server that uses back end functionality through a remote function call (RFC) or other connection, such as an SAP Enterprise Services Architecture (ESA) server. An example of the back end server 300 is an application server of an SAP R/3 system. Examples of the back end functional module 302 are the set of back end service providers 26 (FIG. 3), such as a query service provider 32, an aspect service provider 34, a transaction service provider 40, a locking service provider 42, an action service provider 44, or a query relation service provider 46.

Having the ability to separate the front end server 308 that services the end user computer 312 from the back end server 300 that executes the back end functional modules 302 allows the front end application program 310 to be maintained independently of the back end functional modules 302. When a developer located at the end user computer 312 wishes to use a well-established debugger tool (such as SAPGUI for debug) to debug a back end functional module 302, the debugger tool may not be able identify where the developer is located. Such a debugger tool may be designed to execute on the same computer (e.g., 300) on which the functional module is executing to perform the debugging requests, and establishes a connection with the computer (e.g., 308) that requested execution of the functional module, and generates a GUI on that computer. When such a debugger tool is used under the business software architecture 2, the front end application server 308 requested execution of the back end functional module 302, so from the point of view of the debugger tool, the front end server 308 is the computer with which the debugger tool should establish communication and send debugging information.

To allow a developer to debug back end functional modules from the end user computer 312 that is remote from servers 300 and 308, the debugger tool 304 needs to establish communication with the end user computer 312 and to allow a GUI for debugging to display debugging information on the computer 312. A number of mechanisms can be used to identify the end user computer 312 to the debugger tool 304.

One technique is to have a software method for debugging supported by the front end server 308. One example is a setDebug( ) method that passes parameters specifying whether debugging is activated, the name of the functional module to be debugged, and an identification of the end user computer (which supports the GUI host) with which the debugging tool should establish communication. As a result of using this method, the front end application program 310 requests execution of the debugger tool 304 and further directs the back end server 300 to establish a connection so that debugging information is sent directly to the end user computer 312.

Another technique involves six steps. In a first step, the developer runs an RFC server program 316 on the end user computer 312 and let this program register (320) on a gateway 306 of an back-end server 300. The RFC server 316 then waits for a request to start a debugging session. In one example, the request to start a debugging session includes an SAPGUI-start command (an SAPGUI is a GUI designed to connect to an SAP system).

In a second step, after the RFC server 316 is registered, the developer uses the web browser 314 to connect to the front end server 308 through an HTTP link (322) and invokes the front end application program 310. The developer sends an instruction to let the back end server 300 know that the end user computer 312 is the GUI host for the debugging session. The developer establishes that this session is to be debugged (e.g., by setting a flag that can be detected by the back end server 300), so that when the front end application program 310 accesses the back end functional module 302, the back end server 300 knows that this session is to be debugged, and invokes the debugger tool 304 to debug the functional module 302. The developer can establish that the session is to be debugged in different ways for different programming environments. In one example, the debugger tool 304 is an SAP ABAP debugger.

In a third step, the front end application program 310 uses a front end client 330 to establish a connection 324 with the gateway 306, allowing the front end application program 310 to request services from the back end functional module 302 through the gateway 306. The front end client 330 is configured to work with the functional modules 302 of the back end server 300.

In a fourth step, because previously the developer has established that the back end functional module 302 is to be debugged, the back end server 300 finds the RFC server 316 that is waiting for the request to start debugging, and sends the request (326) (e.g., an SAPGUI-start command) to the RFC server 316. In this example, the request (326) to start a debugging session is sent through the same gateway 306 as the one in which the HTTP connection 322 is made through.

In a fifth step, in response to the request (326) to start a debugging session, the RFC server 316 initiates (332) a user interface 318 (e.g., an SAPGUI).

In a sixth step, the user interface 318 connects with the back end server 300 so that the user interface 318 becomes the user interface for the debugger tool 304. The request (326) to start a debugging session provides information on which back end server the functional module 302 is being executed, so that the user interface 318 knows which back end server to connect. After the connection 328 between the user interface 318 and the debugger tool 304 is established, the user interface 318 can display debugging information sent from the debugger tool 304.

As an example, the back end server 300 provides back end services in an enterprise services framework, and the front end client 330 is configured to provide an interface for accessing the back end services.

Figure 8:
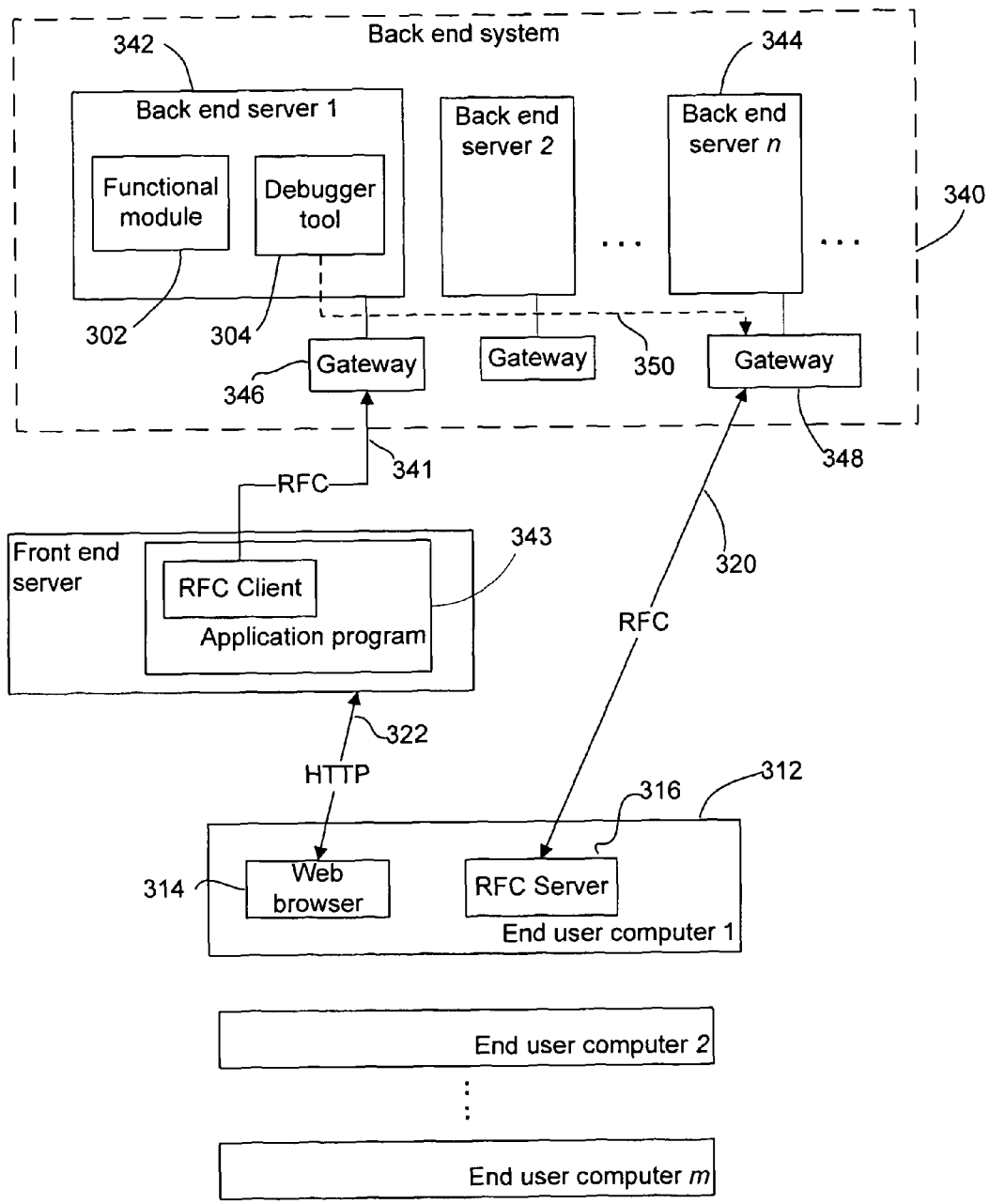

FIG. 8 illustrates a back end system 340 having multiple back end servers (e.g., 342 and 344). In such a system, the process of identifying the end user computer to the debugger tool 304 involves steps similar to the six steps described above, with some differences. The RFC server program 316 can register (320) on a gateway of any back end server of the backend system 340. As an example, assume that the RFC server program 316 registered with a gateway 348 of the back end server 344, and assume that the back end functional module 302 to be debugged resides on the back end server 342. The back end server 342 running the functional module 302 to be debugged has to be connected to the gateway 348 of the back end server 344 on which the RFC server 316 is waiting for a request to start a debugging session.

The connection can be achieved by designing the back end servers so that when a connection (341) to a back end functional module is made (e.g., when a front end application program (e.g., 343) calls a back end functional module (e.g., 302)), the back end server to which the connection is made searches for the back end server that has the RFC server connection, and connects to the RFC server through the gateway that has the connection. The back end server knows to do this because the RFC client of the application program in the front end server tells the back end server that the end user computer 312 is waiting for a request to start a debugging session. Several developers can debug the back end functional modules from multiple end user computers in a similar manner described above.

In FIG. 8, the back end servers can be, for example, SAP application servers.

Figure 9:
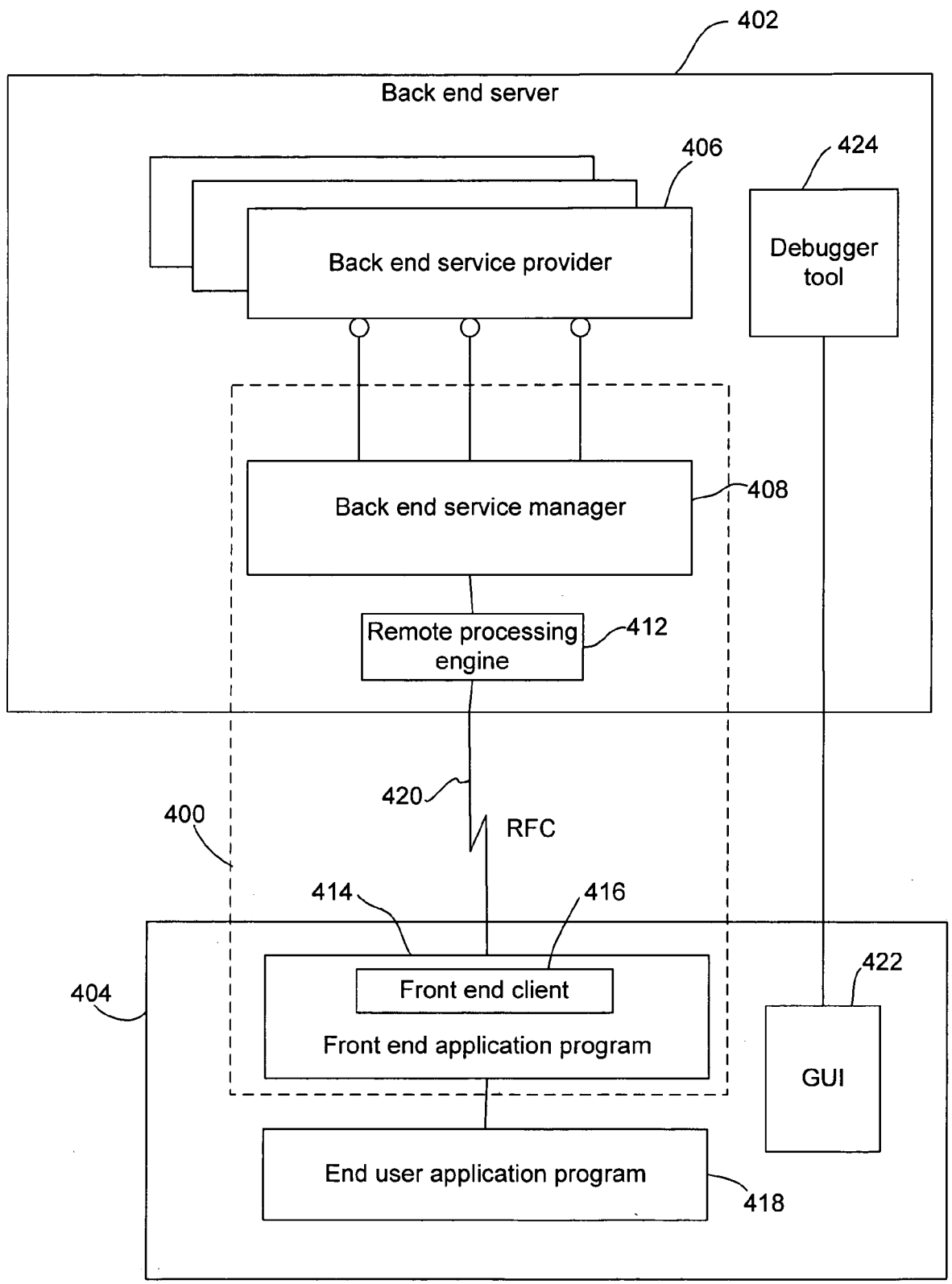

When debugging a back end functional module, a developer may wish to display debugging information related to a particular instance of the back end functional module. For example, as illustrated in FIG. 9, an end user application program 418 executing at an end user computer 404 uses the services provided by a back end service provider 406 executing on a back end server 402. The back end service provider 406 is one of several back end service providers managed by a back end service manager 408. The end user application program 418 requests service from a front end application program 414, which uses a front end client 416 to connect (420) to the back end service manager 408 through a remote processing engine 412. The front end application program 414 and the back end service provider 406 are implemented according to the business software architecture 2.

When a developer wishes to debug the back end service provider 406, the developer sets a flag to indicate that the back end service provider 406 is to be debugged. If the developer does not specify which instance of the service provider is to be debugged, then when the front end application program 414 connects to the back end service provider 406, the back end server 402 stops execution of the back end service provider 406 and starts a debugging session, in which a debugger tool 424 connects to a GUI 422 at the end user computer 404 and sends debugging information to the GUI 422. Several instances of the back end service provider 406 may be created during execution of the end user application program 418. The back end service manager 408 may instantiate multiple instances of the back end service provider 406. The back end service provider 406 may also be instantiated by other modules associated with the execution of the end user application program 418. The developer sets another flag so that the back end service manager 408 tells the debugger tool to stop execution of a particular instance of the back end service provider 406 called by the back end application program 406.

In the example shown in FIG. 9, the end user application program 418, the GUI 422, and the front end client 416 are executed on the same computer 404. Similar to the example shown in FIG. 7, the end user application program 418 and the GUI 422 can also be executed at a computer that is different from the computer on which the front end client 416 is executed. The end user application program 418 can be, for example, a web browser, and the GUI 422 can be, for example, an SAPGUI.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components.

The invention has been described in terms of particular embodiments. Other embodiments are within the scope of the following claims. For example, the steps of the invention can be performed in a different order and still achieve desirable results.

What is claimed is:

1. A method, comprising:
    from a user system, sending an identification of the user system and an indication that the user system is waiting for a request to start a debugging session to a gateway of an application server, the gateway storing the identification and the indication, and the application server being configured to execute a back-end functional module;
    from the user system, sending a notification to the gateway that the back-end functional module is to be debugged;

from the user system, requesting a front-end client program to be executed at a client server, wherein:

the front-end client program requests service from the back-end functional module at a back-end server;

the application server, in response to the request from the front-end client program, accesses the gateway, retrieves the identification of the user system, and transmits the request to start to the debugging session to the user system based on the retrieved identification; and the front-end client program transacts with a service manager resulting in a transaction state notification being sent to a transaction service provider of the back-end functional module;

at the user system, receiving the request to start the debugging session, from the gateway of the application server, the request to start the debugging session comprising information identifying the back-end server;

at the user system, establishing a communications channel with the application server based on the received information, the communications channel enabling direct communication between a user interface of the user system and a debugging tool of the application server; and receiving, at the user system, across the established communication channel, information associated with the debugging session from the debugging tool using remote function calls, wherein the front-end client program and the back-end functional module are executed on computer systems separate from the user system.

2. The method of claim 1, further comprising using the front-end client program to access the back-end functional module through the service manager, the service manager providing a service interface to allow partial separation of software development for the front-end client program and software development for the back-end functional module.

3. The method of claim 2, wherein the back-end functional module processes back-end data that is not directly accessible to the front-end client program.

4. The method of claim 3, wherein the front-end client program indirectly accesses the back-end data using generic commands provided by the service manager, the generic commands causing the service manager to interact with the back-end functional module to access the back-end data.

5. The method of claim 1, wherein the back-end functional module comprises at least one of a query service provider, an aspect service provider, a locking service provider, an action service provider, or a query relation service provider.

6. The method of claim 1, wherein the user interface comprises a graphical user interface.

7. The method of claim 6, wherein the graphical user interface comprises an interface designed to interact with an SAP system.

8. The method of claim 1, wherein the client server communicates with the application server through the gateway, the client server sending remote function calls to the gateway to access services of the back-end functional module.

9. The method of claim 1, wherein requesting the front-end client program to be executed at the client server comprises establishing an HTTP session between the user system and the client server so that results generated by the client program are transmitted to the user system through the HTTP session.

10. The method of claim 9, further comprising executing a web browser program to display results generated by the front-end client program.

11. The method of claim 1, wherein the client server comprises a Java engine.

12. A method for debugging one of a plurality of back-end functional modules, the back-end functional modules being configured to be executed on corresponding application servers of a back-end system, and to service front-end client programs configured to be executed at client servers, the method comprising:

at a first gateway of the back-end system, receiving a notification from a remote function call server executing at a user system that the remote function call server is waiting for a request to start a debugging session;

at a second gateway of the back-end system, receiving a request from a client server for service by a back-end functional module, the back-end functional module being configured to be executed at an application server associated with the second gateway;

in response to the request from the client server, searching for the first gateway using the application server associated with the second gateway, wherein the searching identifies the first gateway based on at least the notification received at the first gateway;

establishing a communication link between the application server associated with the second gateway and the first gateway, based on at least the identification of the first gateway;

sending a request from the first gateway to the remote function call server executing at the user system to start a debugging session to debug the back-end functional module, the request comprising information identifying the application server associated with the second gateway;

establishing a communications channel between the application server associated with the second gateway and the user system based on the received information, the communications channel enabling direct communication between a user interface of the user system and a debugging tool of the application server associated with the second gateway; and sending, from the application server associated with the second gateway, information related to debugging the back-end functional module to the user interface executing at a user system;

at a transaction service provider of the back-end system, receiving a transaction state notification from a service manager; and wherein each of the front-end client programs is executed on a computer system separate from the user system.

13. The method of claim 12, wherein the client server comprises a Java engine.

14. A method, comprising:

providing services to an end user at an end-user system from a front-end application executing on a front-end device acting as a proxy to a back-end application executing on a back-end device, the front-end device and the end-user system being in communication with a gateway of the back-end device, wherein the front-end application is executed on a computer system separate from the end-user system;

receiving a request for a debugging tool and an identification from the end-user system, the request comprising an identification of the end-user system;

providing the identification of the end-user system to the gateway of the back-end device, the gateway storing the provided identification;

sending, to the back-end server, a request to establish a direct communication channel between the back-end device and the-end-user system, wherein:

the direct communications channel enables the debugging tool to send information related to debugging of the back-end application to the end-user system;

the back-end server, in response to the request to establish the direct communication channel, accesses the gateway, retrieves the identification of the end-user system stored at the gateway, and transmits a request to initiate the direct communications channel to the end-user system, the request comprising information identifying the back-end system; and the end-user system establishes the direct communications channel based on at least the received information, and provides a graphical user interface to display the information sent by the debugging tool; and sending, from a service manager to a transaction service provider of the back-end system, a transaction state notification.

15. The method of claim 14, wherein the information comprises information used to analyze performance of the back-end application.

16. The method of claim 14, wherein the back-end application comprises a module for providing information related to customer relationship management.

17. The method of claim 14, wherein the debugging tool comprises a graphical user interface configured to interact with an SAP system.

18. The method of claim 14, wherein the back-end application comprises a module for providing information related to product lifecycle management.

19. The method of claim 14, wherein the back-end application comprises at least one of a query service provider, an aspect service provider, a locking service provider, an action service provider, or a query relation service provider.

20. The method of claim 14, wherein the front-end application communicates with the back-end application through an interface layer that allows the front-end application to be modified independently of the back-end application.

21. The method of claim 14, wherein a debugging subroutine stops the execution of the back-end application upon detection of a break point in the back-end application.

22. The method of claim 14, wherein providing the identification comprises providing the identification using a debug method.

23. The method of claim 14, wherein providing the identification comprises providing an argument specifying whether a debugging function is activated.

24. The method of claim 14, wherein providing the identification comprises providing an argument specifying a back-end module to be debugged.

25. The method of claim 14, wherein providing the identification comprises providing an argument specifying a computer for displaying the parameters related to execution of the back-end application.

26. A method, comprising:

at a second computer, receiving identification information that identifies a first computer sending an indication that a back-end functional module is to be debugged, the back-end functional module being configured to be executed at a back-end server, the first computer and the second computer being in communication with a gateway of the back-end server; and at the second computer, using a second debugger tool to debug a front-end application program executing at the second computer, wherein:

the front-end application program sends the identification information to the gateway, and the gateway stores the identification information; and the front-end application program sends a request for service to the back-end functional module;

initiating, at the back-end server, a first debugger tool to debug the back-end functional module, the initiation being responsive to the request from the front-end application program;

wherein the first debugger tool accesses the gateway, retrieves the identification information of the first computer stored at the gateway, and transmits a request to start a debugging session to the first computer based on at least the retrieved identification, the request comprising information identifying the back-end server;

receiving, at the first computer , the request from gateway of the back-end server and establishes a communications channel with the back-end server based on the received information;

transmitting, via the first debugging tool, debugging information to a user interface executing on the first computer across the established communications channel;

receiving, at a transaction service provider of the back-end server, a transaction state notification from a service manager; and wherein the front-end application program is executed on a computer system separate from the first computer.

27. The method of claim 26, further comprising receiving an indication that the first computer is waiting for the request to start the debugging session.

28. The method of claim 26, further comprising, at the first computer, receiving the request to start the debugging session and providing the user interface to communicate with the back end server using remote function calls to allow the information related to debugging the functional module to be displayed at the first computer.

29. A method, comprising:

providing services to an end-user at an end-user system from a front-end application program executing on a front-end device acting as a proxy to one or more instances of a back-end functional module executing on a back-end server, the front-end device and the end-user system being in communication with a gateway of the back-end server, wherein the front-end application program is executed on a computer system separate from the end-user system;

receiving, at the front-end device, a request from the end-user system for debugging an instance of the back-end functional module, the request comprising an identification of the end-user system;

providing, to back-end server, an indication that the instance of the back-end functional module is to be debugged to cause a debugger tool to be executed at the back-end server to interrupt execution of the instance of the back-end functional module based on the indication, and not interrupt execution of other instances of the back-end functional module;

sending, to the gateway, the identification of the end-user system, the gateway storing the identification;

sending, to the back-end server, a request to establish a direct communication channel between the back-end server and the end-user system, the direct communications channel enabling the debugger tool to send information related to debugging of the instance of the back-end functional module to the end-user system, wherein:

the back-end server, in response to the request to establish the direct communication channel, accesses the gateway, retrieves the identification of the end-user system stored at the gateway, and transmits a request to establish the direct communications channel with the end-user device using at least the retrieved identification, the request comprising information identifying the back-end server; and the end-user system establishes the direct communications channel with the back-end server based on the received information, the direct communications channel enabling a graphical user interface on the end-user system to display debugging information sent from the back-end server by the debugger tool; and sending, from a service manager to a transaction service provider of the back-end server, a transaction state notification.

30. The method of claim 29, wherein the back-end functional module processes back-end data that is not directly accessible to the front-end application program.

31. The method of claim 29, further comprising:
using the front-end client program to access the back-end functional module through the service manager, the service manager providing a service interface to allow partial separation of software development for the front-end application program and software development for the back-end functional module.

32. An apparatus, comprising:
a back-end server including a back-end application program and a debugging tool that generates debugging information to an end-user computer with which the back-end server directly communicates;
a front-end server in communication with the end-user computer and the back-end server, the front-end server including a front-end application program that requests service from the back-end application program to provide service to the end-user computer, wherein the front-end application program is executed on a computer system separate from the end-user computer; and
a gateway associated with the back-end server, the gateway being in communication with the end-user computer and the front-end server, the gateway comprising:
a module for receiving an identification of the end-user computer and an indication that the end-user computer is waiting for a request to initiate the debugging tool; and
a storage device configured to store a received identification and indication,
wherein the back-end server comprises:
a module configured to receive an indication that the back-end application program is to be debugged;
a module configured to access the gateway and retrieve the identification of the end-user system stored at the gateway in response to the indication; and
a module configured to establish a direct communication channel between the back-end server and the end-user computer to use the debugging tool using the retrieved identification;
a transaction service provider configured to receive a transaction state notification from a service manager; and
further wherein:
the back-end server sends the request to initiate the debugging tool to the end-user computer based on at least the retrieved information, the request comprising information identifying the back-end server; and
the end-user computer, in response to the request, establishes the direct communications channel and provides a user interface to display the debugging information received from the back-end server across the direct communications channel.

33. The apparatus of claim 32, wherein user interface comprises a graphical user interface.

34. The apparatus of claim 32, wherein the back-end application program comprises a module for providing information related to customer relationship management.

35. The apparatus of claim 32, wherein the back-end application program comprises a module for providing information related to product lifecycle management.

36. The apparatus of claim 32, wherein the front-end server communicates with the back-end server through an interface layer that allows the front-end application program to be modified independently of the back-end application.

37. The apparatus of claim 32, wherein the debugging tool stops the execution of the back-end application program upon detection of a break point in the back-end application program.

38. The apparatus of claim 32, wherein the debugging tool receives an argument specifying a hostname of the end-user computer.

39. The apparatus of claim 32, wherein the debugging tool receives an argument specifying a name of a back-end service module to be debugged.

40. The apparatus of claim 32, wherein the debugging tool comprises SAPGUI for debug.

41. A non-transitory computer program product, tangibly embodied in a machine-readable storage device, for remote debugging, the computer program product being operable to cause a data processing apparatus to:
send an identification of the data processing apparatus and an indication that the data processing apparatus is waiting for a request to start a debugging session to a gateway of a back-end server configured to execute a back-end functional module, the gateway storing the identification and the indication;
send a notification that the back-end functional module is to be debugged;
request a front-end client program to be executed at a client server, wherein:
the front-end client program requests service from the back-end functional module at the back-end server; and
the back-end server, in response to the request from the front-end client program, accesses the gateway, retrieves the identification of the data processing apparatus, and transmits the request to start to the debugging session to the data processing apparatus based on the retrieved identification; and
the front-end client program transacts with a service manager resulting in a transaction state notification being sent to a transaction service provider of the back-end server from a service manager;
receive the request to start the debugging session from the gateway of the back-end server, the request to start the debugging session comprising information identifying the back-end server;
establish a communications channel between the back-end server and the data processing apparatus based on the received information, the communications channel enabling direct communication between a user interface of the data processing apparatus and a debugging tool of the back-end server; and
receive, across the established communication channel, information associated with the debugging session from the debugging tool using remote function calls, wherein the front-end client program and the back-end functional module are executed on computer systems separate from the data processing apparatus.

42. The computer program product of claim 41, being operable to further cause the front-end client program to access the back-end functional module through the service manager, the service manager to provide a service interface to allow partial separation of software development for the front-end client program and software development for the back-end functional module.

43. The computer program product of claim 42, wherein the front-end client program indirectly accesses the back-end data using generic commands provided by the service manager, the generic commands causing the service manager to interact with the back-end functional module to access the back-end data.

44. A non-transitory computer program product, tangibly embodied in a machine-readable storage device, for remote debugging one of a plurality of back-end functional modules, the back-end functional modules being configured to be executed on corresponding application servers of a back-end system, and to service front-end client programs configured to be executed at client servers, the computer program product being operable to cause:
a first gateway of the back-end system to receive a notification from a remote function call server executing at a user system that the remote function call server is waiting for a request to start a debugging session;
a second gateway of the back-end system to receive a request from a client server for service by a back-end functional module, the back-end functional module being configured to be executed at an application server associated with the second gateway;
in response to the request from the client server, the application server associated with the second gateway to search for the first gateway, wherein the searching identifies the first gateway based on at least the notification received at the first gateway;
the application server associated with the second gateway to establish a communication link with the first gateway, based on at least the identification of the first gateway;
the first gateway to send a request to the remote function call server executing at the user system to start a debugging session to debug the back-end functional module, the request comprising information identifying the application server associated with the second gateway; and
the user system to establish a communications channel between the application server associated with the second gateway and the user system based on the received information, the communications channel enabling direct communication between a user interface of the user system and a debugging tool of the application server associated with the second gateway; and
the application server associated with the second gateway to send information related to debugging the back-end functional module to the user interface executing at a user system,
a transaction service provider of the back-end functional module to receive a transaction state notification from a service manager; and
wherein each of the front-end client programs is executed on a computer system separate from the user system.

45. The computer program product of claim 44, wherein a debugger tool of the application server sends the information related to debugging the functional module to the user interface through the first gateway.

46. A non-transitory computer program product, tangibly embodied a machine-readable storage device, for remote debugging, the computer program product being operable to cause a data processing apparatus to:
provide services to an end user at an end-user system from a front-end application executing on a front-end device acting as a proxy to a back-end application executing on a back-end system, the front-end device and the end-user system being in communication with a gateway of the back-end system, wherein the front-end application is executed on a computer system separate from the end-user system;
receive, at the front-end device, a request for a debugging tool from the end-user system, the request comprising an identification of the end-user system;
provide, from the end-user system, the identification of the end-user system to the gateway of the back-end system, the gateway storing the provided identification;
sending, to the back-end server, a request to establish a direct communication channel between the back-end system and the end-user system, wherein:
the direct communications channel enables the debugging tool to send information related to debugging the back-end application to the end-user system,
the back-end server, in response to the request to establish the communication channel, accesses the gateway, retrieves the identification of the end-user system stored at the gateway, and transmits a request to initiate the direct communications channel to the end-user system, the request comprising information identifying the back-end system; and
the end-user system establishes the direct communications channel based on at least the received information and provides a graphical user interface to display the information sent by the debugging tool across the direct communications channel; and
sending, to a transaction service provider of the back-end server, a transaction state notification from a service manager.

47. The computer program product of claim 46, being operable to cause the data processing apparatus to provide an argument to the back-end system specifying a back-end module to be debugged.

48. A non-transitory computer program product, tangibly embodied in a machine-readable storage device, for remote debugging, the computer program product being operable to cause a data processing apparatus to:
at a second computer, receive identification information that identifies a first computer sending an indication that a back-end functional module is to be debugged, the back-end functional module being configured to be executed at a back-end server, the first computer and the second computer being in communication with a gateway of the back-end server; and
at the second computer, use a second debugger tool to debug a front-end application program executing at the second computer, wherein:
the front-end application program sends the identification information to the gateway, and the gateway stores the identification information;
the front-end application program sends a request for service to from the back-end functional module;
the back-end server initiates a first debugger tool to debug the back-end functional module, the initiation being responsive to the request from the front-end application program;

a transaction service provider of the back-end server receives a transaction state notification from a service manager;

the first debugger tool accesses the gateway, retrieves the identification information of the first computer stored at the gateway, and transmits a request to start a debugging session to the first computer based on at least the retrieved identification, the request comprising information identifying the back-end server;

the first computer receives the request from the gateway of back-end server and establishes a communications channel with the back-end server based on the received information;

the first debugging tool transmits debugging information to a user interface executing on the first computer across the established communications channel;

the front-end application program is executed on a computer system separate from the first computer.

49. The computer program product of claim 48, being operable to cause the first computer to send an indication that the first computer is waiting for the request to start the debugging session.

50. The computer program product of claim 48, being operable to cause the first computer to receive the request to start the debugging session and provide the user interface to communicate with the back-end server using remote function calls to allow the information related to debugging the functional module to be displayed at the first computer.

51. A non-transitory computer program product, tangibly embodied in a machine-readable storage device, for remote debugging, the computer program product being operable to cause data processing apparatus to:

providing services to an end user at an end-user system from a front-end application program executing on a front-end device acting as a proxy to one or more instances of a back-end functional module executing on a back-end server, the front-end device and the end-user system being in communication with a gateway of the back-end device, wherein the front-end application program is executed on a computer system separate from the end-user system;

receiving, at the front-end device, a request from the end-user system for debugging an instance of the back-end functional module, the request comprising an identification of the end-user system;

providing, to back-end server, an indication that the instance of the back-end functional module is to be debugged to cause a debugger tool to be executed at the back-end server to interrupt execution of the instance of the back-end functional module based on the indication, and not interrupt execution of other instances of the back-end functional module;

sending, to the gateway, the identification of the end-user system, the gateway storing the identification;

sending, to the back-end server, a request to establish a direct communication channel between the back-end server and the end-user system, the communications channel enabling the debugger tool to send information related to debugging of the instance of the back-end functional module to the end-user system, wherein:

the back-end server, in response to the request to establish the direct communication channel, accesses the gateway, retrieves the identification of the end-user system stored at the gateway, and transmits a request to establish the direct communications channel with the end-user device using at least the retrieved identification, the request comprising information identifying the back-end server; and the end-user system establishes the direct communications channel with the back-end server based on the received information, the direct communications channel enabling a graphical user interface on the end-user system to display debugging information sent from the back-end server by the debugger tool; and sending, from a service manager to a transaction service provider of the back-end functional module, a transaction state notification.

52. The computer program product of claim 51, wherein the back-end functional module processes back-end data that is not directly accessible to the front-end application program.

53. The computer program product of claim 51, being operable to cause the front-end client program to access the back-end functional module through the service manager, the service manager providing a service interface to allow partial separation of software development for the front-end application program and software development for the back-end functional module.

* * * * *